US012083955B2

(12) United States Patent
Thakur et al.

(10) Patent No.: US 12,083,955 B2
(45) Date of Patent: Sep. 10, 2024

(54) DYNAMIC INTER-VEHICLE COMMUNICATION REGARDING RISK DETECTED BASED ON VEHICLE SENSOR MEASUREMENTS

(71) Applicant: GM Cruise Holdings LLC, San Francisco, CA (US)

(72) Inventors: Divya Thakur, San Francisco, CA (US); Rajat Basu, San Francisco, CA (US); Jeffrey Brandon, Phoenix, AZ (US); Daniel Kan, San Francisco, CA (US); Michael Frank Schmidt, Scottsdale, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 157 days.

(21) Appl. No.: 16/730,486

(22) Filed: Dec. 30, 2019

(65) Prior Publication Data

US 2021/0197846 A1    Jul. 1, 2021

(51) Int. Cl.
*B60Q 5/00* (2006.01)
*B60Q 1/50* (2006.01)
*B60W 40/06* (2012.01)
*B60W 50/14* (2020.01)
*G01S 17/931* (2020.01)

(52) U.S. Cl.
CPC ........... *B60Q 5/006* (2013.01); *B60Q 1/5037* (2022.05); *B60Q 1/507* (2022.05); *B60Q 1/525* (2013.01); *B60Q 1/535* (2022.05); *B60Q 1/545* (2022.05); *B60W 40/06* (2013.01); *B60W 50/14* (2013.01); *G01S 17/931* (2020.01); *B60Q 2400/50* (2013.01); *B60W 2050/143* (2013.01); *B60W 2050/146* (2013.01)

(58) Field of Classification Search
CPC ................. B60W 50/14; B60W 40/06; B60W 2050/143; B60W 2050/146; G01S 17/931
See application file for complete search history.

(56) References Cited

U.S. PATENT DOCUMENTS

| | | | |
|---|---|---|---|
| 10,134,280 B1 * | 11/2018 | You ........................... | B60Q 1/34 |
| 10,163,350 B1 * | 12/2018 | Fields .............. | G08G 1/096791 |
| 10,636,308 B2 * | 4/2020 | Glatfelter .............. | B66F 9/0755 |
| 10,679,530 B1 * | 6/2020 | Schmalenberg ...... | B60W 50/14 |
| 10,762,786 B1 * | 9/2020 | Dewey .................. | B60W 50/16 |
| 10,773,643 B1 * | 9/2020 | Patnaik .................. | G06V 20/58 |
| 2017/0305349 A1 * | 10/2017 | Naboulsi ................ | B60R 1/025 |
| 2018/0273050 A1 * | 9/2018 | Tertoolen .......... | G08G 1/096861 |
| 2019/0051184 A1 * | 2/2019 | Lahav ..................... | G08G 1/166 |
| 2019/0100198 A1 * | 4/2019 | Hakki .................... | B60Q 9/008 |
| 2020/0090510 A1 * | 3/2020 | Nagarajan ......... | G08G 1/096716 |
| 2020/0380257 A1 * | 12/2020 | He ......................... | B60W 50/14 |
| 2021/0129859 A1 * | 5/2021 | Omasta ................ | G05D 1/0055 |

(Continued)

*Primary Examiner* — Aniss Chad
*Assistant Examiner* — Christopher George Fees

(57) ABSTRACT

Sensors coupled to a first vehicle are used to measure sensor measurements. Based on the sensor measurements, the first vehicle identifies a risk to the first vehicle and/or to a second vehicle near the first vehicle, for example based on a distance between the first and second vehicle being unsafely low. The first vehicle generates an alert based on the risk and outputs the alert toward the second vehicle, for example visually through a screen and/or audibly using speakers, to warn an operator of the second vehicle about the risk.

17 Claims, 22 Drawing Sheets

(56) References Cited

U.S. PATENT DOCUMENTS

| | | | |
|---|---|---|---|
| 2021/0134156 A1* | 5/2021 | Lee | B60W 40/04 |
| 2022/0144257 A1* | 5/2022 | Maeda | B60W 10/20 |
| 2023/0005374 A1* | 1/2023 | Elimaleh | G06V 20/588 |
| 2023/0256972 A1* | 8/2023 | Roy | B60T 8/1725 |
| | | | 73/146 |

* cited by examiner

Display device 600

Display device 700

Display device 800

Display device 900

Display device 1000

Display device 1100

Display device 1200

Display device 1300

Display device 1400

Display device 1500

Display device 1600

Display device 1700

Display device 1800

Display device 1900

DYNAMIC INTER-VEHICLE COMMUNICATION REGARDING RISK DETECTED BASED ON VEHICLE SENSOR MEASUREMENTS

TECHNICAL FIELD

The present invention generally pertains to inter-vehicle communication. More specifically, the present invention pertains to generating measurements using sensors of a vehicle and outputting those measurements, or insights based on those measurements, in an external-facing manner to alert drivers of other nearby vehicles about information relevant to driving safety.

BACKGROUND

An autonomous vehicle is a motorized vehicle that can navigate without a human driver. An exemplary autonomous vehicle includes a plurality of sensor systems, such as, but not limited to, a camera sensor system, a light detection and ranging (LIDAR) sensor system, or a radio detection and ranging (RADAR) sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system. Such sensors may also be mounted on other vehicles, such as vehicles that are used to generate or update street maps as they drive.

A rear-end collisions is a collision between a rear vehicle and a front vehicle that is in front of the rear vehicle, in which the rear vehicle crashes into the rear of the front vehicle. Rear-end collisions are often caused by the rear vehicle following the front vehicle at an unsafely close distance that does not allow the operator of the rear vehicle enough time to react to the front vehicle slowing down or stopping, sometimes referred to as tailgating. The front vehicle may need to slow down or stop due to circumstances that the rear vehicle is unaware of and cannot detect, such as a hazard present on the road ahead of the front vehicle. Rear-end collisions may also be caused by driver inattention or distraction, usually on the part of the driver of the rear vehicle but in some cases also on the part of the driver of the front vehicle. Rear-end collisions may cause serious injuries, such as whiplash or herniation, and may even cause death, both for drivers and passengers of both the rear and front vehicles.

Autonomous vehicles may be particularly susceptible to being on the receiving end of a rear-end collision, as some autonomous vehicles may react in slightly different ways to a road hazard than a human driver would, which a driver behind the autonomous vehicle might not expect. For example, some autonomous vehicles may be able to detect a hazard sooner than a human driver using sensors that a human driver does not have access to, and may thus react to a hazard sooner than a human driver would. Furthermore, some autonomous vehicles may have a shorter delay between detection of a hazard and performing an appropriate reaction, such as application of brakes, than a human driver.

Reducing rear-end collisions, especially those involving autonomous vehicles, would result in improvements in safety to drivers and passengers.

SUMMARY

Techniques and systems are described herein for dynamic inter-vehicle communication regarding one or more risks detected based on vehicle sensor measurements.

In one example, a system for inter-vehicle communication is provided. The system is coupled to a first vehicle. The system includes one or more sensors that measure one or more sensor measurements. The system includes an output device facing an exterior area around the first vehicle, wherein the exterior area includes a second vehicle. The system includes a memory storing instructions and a processor that executes the instructions. Execution of the instructions by the processor causes the processor to perform system operations. The system operations include identifying a risk to the second vehicle based on the one or more sensor measurements. The system operations also include generating an alert based on the risk and outputting the alert using the output device such that the alert is directed toward the second vehicle.

In another example, a method of inter-vehicle communication between a first vehicle and a second vehicle is provided. The method includes measuring one or more sensor measurements using one or more sensors associated with the first vehicle. The method also includes identifying a risk to the second vehicle based on the one or more sensor measurements. The method also includes generating an alert based on the risk and outputting the alert using an output device associated with the first vehicle such that the alert is directed toward the second vehicle.

In another example, a non-transitory computer readable storage medium is provided. The non-transitory computer readable storage medium has embodied thereon a program that is executable by a processor to perform a method of inter-vehicle communication between a first vehicle and a second vehicle. The method includes measuring one or more sensor measurements using one or more sensors associated with the first vehicle. The method also includes identifying a risk to the second vehicle based on the one or more sensor measurements. The method also includes generating an alert based on the risk and outputting the alert using an output device associated with the first vehicle such that the alert is directed toward the second vehicle.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 13 illustrates a display device for displaying a visual alert identifying a defect with a second vehicle that is detected by the first vehicle and that an operator of the second vehicle may be unaware of.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Sensors coupled to a first vehicle are used to measure sensor measurements. Based on the sensor measurements, the first vehicle identifies a risk to the first vehicle and/or to a second vehicle near the first vehicle, for example based on a distance between the first and second vehicle being unsafely low. The first vehicle generates an alert based on the risk and outputs the alert toward the second vehicle, for example visually through a screen and/or audibly using speakers, to warn an operator of the second vehicle about the risk.

The disclosed technologies and techniques address a need in the art for improvements to vehicle safety technologies. Rear-end collisions are a major issue for vehicles, and particularly for autonomous vehicles whose sensors may detect risks that humans might not notice, and whose response time between detecting risks and executing countermeasurses may be faster than human response times. Autonomous vehicles, and other vehicles with sensors, may use those sensors for the benefit of other vehicles on the road, to warn other vehicles of risks. For instance, a front vehicle that is in front of a rear vehicle may warn the rear vehicle when the front and rear vehicles are too close to one another for the rear vehicle to have enough time to properly react to the front vehicle's actions given the current speeds of the two vehicles. This may prevent a rear-end collision. Similarly, the a first vehicle may warn a second vehicle of a hazard on the road that the operator of the second vehicle might not be in a position to see, or may be able to warn the second vehicle of a risk-causing defect with either the first vehicle or the second vehicle. Ultimately, such warnings may be used to prevent a variety of types of vehicular accidents and save lives.

Figure 1:
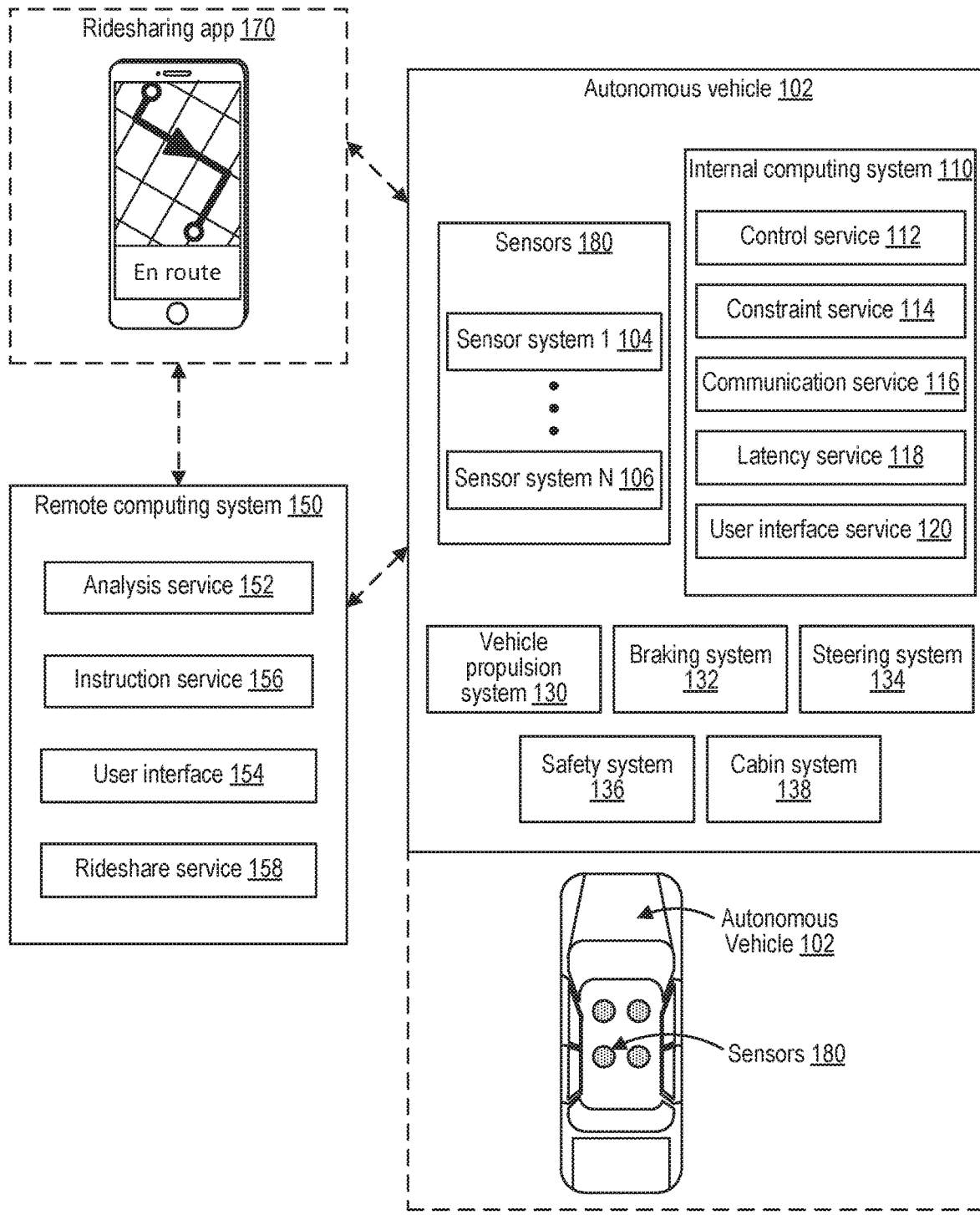
FIG. 1 illustrates an autonomous vehicle and remote computing system architecture.

FIG. 1 illustrates an autonomous vehicle and remote computing system architecture.

The autonomous vehicle 102 can navigate about roadways without a human driver based upon sensor signals output by sensor systems 180 of the autonomous vehicle 102. The autonomous vehicle 102 includes a plurality of sensor systems 180 (a first sensor system 104 through an Nth sensor system 106). The sensor systems 180 are of different types and are arranged about the autonomous vehicle 102. For example, the first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it should be understood that more or fewer sensors may be coupled to the autonomous vehicle 102.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. In some cases, the braking system 132 may charge a battery of the vehicle through regenerative braking. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 180 and the systems 130, 132, 134, 136, and 138. The internal computing system includes at least one processor and at least one memory having computer-executable instructions that are executed by the processor. The internal computing system 110 may include one or more computing systems 2200, or may include at least a subset of components discussed with respect to the computing system 2200. The computer-executable instructions can make up one or more services responsible for controlling the autonomous vehicle 102, communicating with remote computing system 150, receiving inputs from passengers or human co-pilots, logging metrics regarding data collected by sensor systems 180 and human co-pilots, etc.

The internal computing system 110 can include a control service 112 that is configured to control operation of the vehicle propulsion system 130, the braking system 132, the steering system 134, the safety system 136, and the cabin system 138. The control service 112 receives sensor signals from the sensor systems 180 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 4G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

Figure 15:
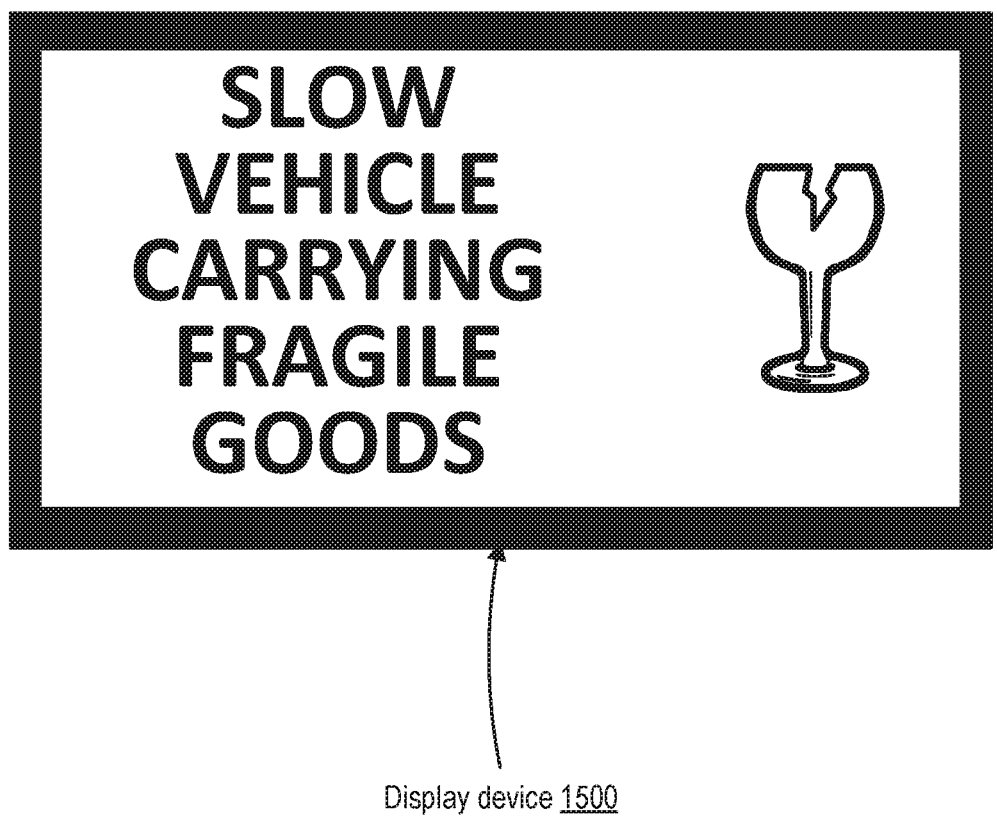
FIG. 15 illustrates a display device for displaying a visual alert identifying that a first vehicle is driving slowly because the first vehicle is carrying fragile goods.

The internal computing system 110 can, in some cases, include at least one computing system 1500 as illustrated in or discussed with respect to FIG. 15, or may include at least a subset of the components illustrated in FIG. 15 or discussed with respect to computing system 1500.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

The rideshare service 158 as depicted in FIG. 1 illustrates a vehicle 102 as a triangle en route from a start point of a trip to an end point of a trip, both of which are illustrated as circular endpoints of a thick line representing a route traveled by the vehicle. The route may be the path of the vehicle from picking up the passenger to dropping off the passenger (or another passenger in the vehicle), or it may be the path of the vehicle from its current location to picking up another passenger.

The remote computing system 150 can, in some cases, include at least one computing system 1500 as illustrated in or discussed with respect to FIG. 15, or may include at least a subset of the components illustrated in FIG. 15 or discussed with respect to computing system 1500.

Figure 2:
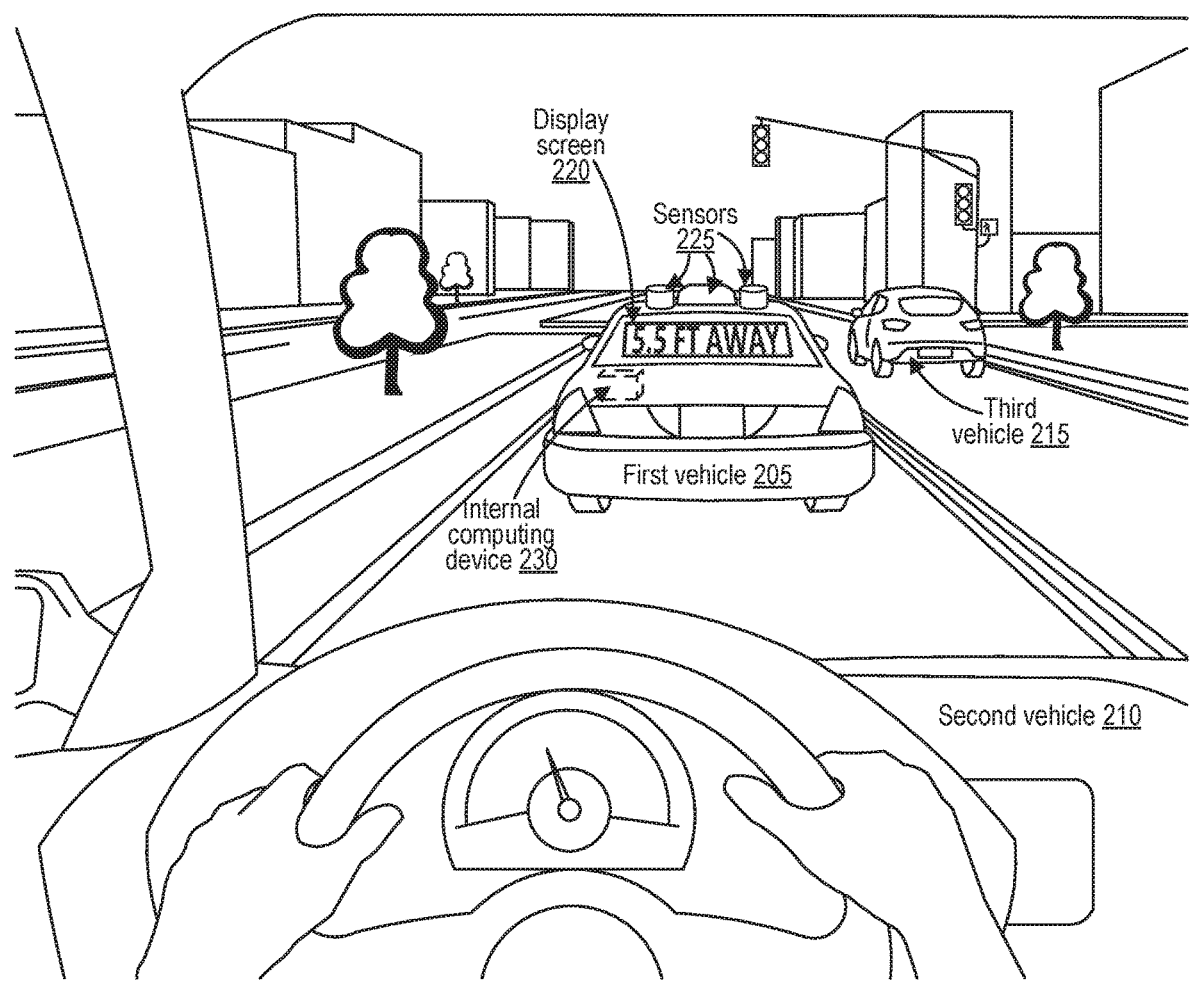
FIG. 2 illustrates a first vehicle outputting a visual alert to a second vehicle by displaying the alert on a rear-mounted externally-facing display screen.

FIG. 2 illustrates a first vehicle outputting a visual alert to a second vehicle by displaying the alert on a rear-mounted externally-facing display screen.

In particular, a first vehicle 205, a second vehicle 210, and a third vehicle 215 are illustrated traveling along a thoroughfare in an environment that is seen from a perspective of an operator of the second vehicle 210. The first vehicle 205, second vehicle 210, and third vehicle 215 are illustrated as automobiles. Automobiles may be referred to as cars, and may include sedans, coupes, trucks, semi-trucks, sport utility vehicles (SUVs), multi-purpose vehicles (MPVs), multi-utility vehicles (MUVs), vans, minivans, convertibles, hatchbacks, crossovers, cabriolets, cruisers, roadsters, station wagons, hearses, tanks, buses, ambulances, police cars, fire trucks, or combinations thereof. In some cases, the first vehicle 205, the second vehicle 210, and/or the third vehicle 215 may be autonomous vehicles 102, or may include any combination of components of the autonomous vehicle 102 of FIG. 1, including any combination of the sensors 180. The thoroughfares of FIG. 2 are illustrated as roads, which may be referred to as streets, and may include highways, freeways, expressways, alleys, avenues, boulevards, causeways, courts, frontage roads, lanes, one-way streets, terraces, plazas, routes, side roads, tunnels, bridges, arterial roads, parkways, beltways, turnpikes, private roads, driveways, intersections, interchanges, roundabouts, runways, race tracks, paved roads, unpaved roads, cobblestone roads, gravel roads, dirt paths, or some combination thereof.

The first vehicle 205 of FIG. 2 is illustrated including a number of sensors 225, which are illustrated in FIG. 2 as including roof-mounted sensors. In some cases, the sensors 225 may include rear-mounted sensors, side-mounted sensors, front-mounted sensors, undercarriage-mounted sensors, and/or sensors mounted inside the first vehicle 205. The sensors 225 may include any combination of types of sensors discussed with respect to the sensors 180 of the autonomous vehicle 102 of FIG. 1, such as cameras, RADAR sensors, LIDAR sensors, SONAR/SODAR sensors, GNSS receivers, IMU sensors, microphones, and so forth. The first vehicle 205 may also include one or more internal computing device(s) 230, illustrated in FIG. 2 as a box with dashed lines. The internal computing device 230 may include one or more internal computing system(s) 110 as discussed with respect to FIG. 1, one or more computing system(s) 2200 as discussed with respect to FIG. 22, or some combination thereof.

The sensors 225 of the first vehicle 205 may be used to capture or measure sensor data, which may be referred to as sensor measurements. The internal computing device 230 may then process the sensor measurements. The sensor measurements may include, for example, visual light images or videos captured by camera(s) of the sensors 225, thermal/IR images or videos captured by thermal/IR camera(s) of the sensors 225, ranges (or point clouds thereof) detected by a RADAR sensor of the sensors 225a, ranges (or point clouds thereof) detected by a LIDAR sensor of the sensors 225, ranges (or point clouds thereof) detected by a SONAR/SODAR sensor of the sensors 225, locations of the first vehicle 205 determined based on wireless GNSS signals received wirelessly by a GNSS receiver of the sensors 225, locations of the first vehicle 205 determined based on wireless local area network (WLAN) signals received wirelessly by a WLAN receiver of the sensors 225, locations of the first vehicle 205 determined based on wireless cellular network signals received wirelessly by a cellular network receiver of the sensors 225, acceleration and/or rotations and/or movements detected by one or more IMU sensors of the sensors 225, audio detected by one or more microphones of the sensors 225, or combinations thereof.

Based on the sensor measurements measured by the sensors 225, the internal computing device 230 of FIG. 2 identifies, based on the sensor measurements, a risk to the first vehicle 205, to the second vehicle 210, to the third vehicle 215, to any other vehicles or pedestrians on or near the throughfare, or some combination thereof. In the situation illustrated in FIG. 2, the internal computing device 230 identifies, based on the sensor measurements, that the second vehicle 210 is 5.5 feet away from the first vehicle 205. The internal computing device 230 may identify that this distance between the first vehicle 205 and the second vehicle 210—5.5 feet—is unsafely low, and should be higher to ensure safer driving conditions. In particular, the internal computing device 230 may identify that this distance between the first vehicle 205 and the second vehicle 210 is below a safe threshold distance. Based on this, the internal computing device 230 displays an alert on an externally-facing display screen 220, the alert identifying that the distance between the first vehicle 205 and the second vehicle 210 is only 5.5 feet. Because the display screen 220 is rear-facing, and because the second vehicle 210 is behind the first vehicle 210, the display screen 220 is directed toward (i.e., faces toward) the second vehicle 230 such that an operator (driver) and/or one or more passengers of the second vehicle 210 may be able to view and/or read the alert. In some cases, the operator of the second vehicle 210 may then slow the second vehicle 210 down to increase the distance between the first vehicle 205 and the second vehicle 210 to a safer distance, thus reducing the identified risk. This reduces the chance of a rear-end collision and/or other types of vehicular accidents, increasing safety for all vehicles, drivers, and passengers in the first vehicle 205 and the second vehicle 210 and for all for all vehicles, drivers, passengers, and pedestrians in the vicinity of these two vehicles (e.g., the third vehicle 215 and its driver and passengers).

In some cases, the safe threshold distance may be a constant distance value. For example, the safe threshold distance may be 1 foot, 2 feet, 3 feet, 4 feet, 5 feet, 6 feet, 7 feet, 8 feet, 9 feet, 10 feet, 11 feet, 12 feet, 13 feet, 14 feet, 15 feet, 16 feet, 17 feet, 18 feet, 19 feet, 20 feet, 21 feet, 22 feet, 23 feet, 24 feet, 25 feet, a distance value greater than 25 feet, or a distance value in between any two listed distance values. In other cases, the safe threshold distance may vary depending on the speed of the first vehicle 205 and/or the speed of the second vehicle 210. That is, the internal computing device 230 may determine the speed of the first vehicle 205 via one or more of the sensors 225, such as an internal speedometer or by identifying locations of the first vehicle 205 at different times using a GNSS receiver (or other positioning receiver) and calculating speed based on the formula d=r·t. In this case, d signifies distance between measured locations, r signifies the speed (rate) of the first vehicle 205, and t signifies time.

The internal computing device 230 may, in some cases, assume that the second vehicle 210 is traveling at a similar speed to the first vehicle 205. Alternately, the internal computing device may determine the speed of the second vehicle 210 as discussed further below. Either way, the internal computing device may calculate an appropriate distance between the first vehicle 205 and the second vehicle 210 by solving for d using the formula d=r·t. In this case, d signifies the safe distance threshold between the first vehicle 205 and the second vehicle 210, r signifies the speed (rate) of the first vehicle 205 and/or of the second vehicle 210, and t signifies a predetermined amount of time corresponding to an average human risk detection and reaction speed. For example, if an average human driver requires 2 seconds to detect and react to a risk (1=2 seconds), and the speed of the first vehicle 205 and/or of the second vehicle 210 is 40 miles per hour (mph) (r=40 mph), then the safe distance threshold d, once conversions are performed between hours and seconds, is 0.02222 miles, or 117.3 feet. Because the distance between the first vehicle 205 and the second vehicles 210 of 5.5 feet as illustrated in FIG. 2 is less than the safe distance threshold d=117.3 feet, the second vehicle 210 is unsafely close to the first vehicle 205 and should be alerted to this fact. Different values for t can be used in this determination, such as 1 second, 1.5 seconds, 2 seconds. 2.5 seconds, 3 seconds, 3.5 seconds, 4 seconds, 4.5 seconds, 5 seconds, 5.5 seconds, 6 seconds, 6.5 seconds, 7 seconds, 7.5 seconds, 8 seconds, 8.5 seconds, 9 seconds, 9.5 seconds, 10 seconds, a time value greater than 10 feet, or a time value in between any two listed time values. In some cases, an additional buffer distance (e.g. 1 foot, 2 feet, 3 feet, 4 feet, 5 feet, 6 feet, 7 feet, 8 feet, 9 feet, 10 feet, a distance value greater than 10 feet, or a distance value in between any two of the listed distance values) may be added to the determined safe distance threshold d as an additional safety precaution.

The internal computing device 230 may alternately compute the safe distance threshold between the between the first vehicle 205 and the second vehicle 210 by solving for Δs using the stopping distance formula $$\Delta s = \frac{v^2}{2 \cdot \mu \cdot g}.$$

In this case, Δs signifies a stopping distance of a vehicle, v signifies the velocity of the first vehicle 205 and/or of the second vehicle 210, µ signifies a coefficient of friction between the wheels of the vehicle and the road, and g signifies gravitational acceleration (g=9.80665 m/s²). The stopping distance Δs may be used as the safe distance threshold. For example, if the first vehicle 205 and/or the second vehicle 210 is/are determined to have a speed of 40 mph (v=40 mph) and the coefficient of friction is 0.91 (µ=0.91), then the stopping distance Δs comes out to 17.93 meters, or 58.82 feet, after conversions between miles and meters and between hours and seconds. Different values for the coefficient of friction µ may be used. The stopping distance Δs may be used as the safe distance threshold, though in some cases, an additional buffer distance (e.g. 1 foot, 2 feet, 3 feet, 4 feet, 5 feet, 6 feet, 7 feet, 8 feet, 9 feet, 10 feet, a distance value greater than 10 feet, or a distance value in between any two of the listed distance values) may be added to the stopping distance Δs as an additional safety precaution. Because the distance between the first vehicle 205 and the second vehicles 210 of 5.5 feet as illustrated in FIG. 2 is less than the safe distance threshold 58.82 feet (even without any additional buffer distance added), the second vehicle 210 is unsafely close to the first vehicle 205 and should be alerted to this fact.

Use of the coefficient of friction µ in calculating the safe distance threshold may allow the internal computing device 230 to account for different types of vehicles and different weather conditions. In some cases, the first vehicle 205 may determine a value for the coefficient of friction µ based at least in part on one or more measurements from its sensors 225, used to detect friction/traction between the tires of the first vehicle 205 and the road. In some cases, the first vehicle 205 may determine a value for the coefficient of friction µ at least in part based on a set of predetermined values for µ that change based on the weather, and may for example base µ on a first of these values when the sensors 225 detect that the weather is rainy and/or flooded, may base µ on a second one of these values when the sensors 225 detect that the weather is snowy, may base µ on a third one of these values when the sensors 225 detect that the weather is icy, may base µ on a fourth one of these values when the sensors 225 detect that the weather is hailing, and may base µ on a fifth one of these values when the sensors 225 detect that the weather is sunny. For example, the coefficient of friction µ may be lower during rainy or icy weather conditions than the coefficient of friction µ is during sunny and warm weather conditions.

In some cases, the first vehicle 205 may determine a value for the coefficient of friction µ at least in part based on another set of predetermined values for µ that change based on a type or model of the second vehicle 210 as determined by the first vehicle 205, and may for example base µ on a first of these values when the sensors 225 detect that the second vehicle 210 is of a model/type that includes anti-lock brakes, or may base µ on a second one of these values when the sensors 225 detect that the second vehicle 210 is of a model/type that does not include anti-lock brakes. For example, the coefficient of friction µ may be higher for a vehicle known to have anti-lock brakes than the coefficient of friction µ is for a vehicle known to lack anti-lock brakes.

Rather than assuming that the second vehicle 210 is traveling at a similar speed to the first vehicle 205, the internal computing device 230 may, in some cases, determine the speed of the second vehicle 210. If the internal computing device 230 knows the location of the first vehicle 205 at multiple points in time (e.g., based on a GNSS receiver of the sensors 225) and knows the distance between the first vehicle 205 and the second vehicle 210 while the first vehicle 205 at those same locations and/or points in time (or within a range of them), the internal computing device 230 may determine the location of the second vehicle 210 at each of those points in time, and can determine the speed of the second vehicle 210 based on the determined locations of the second vehicle 210 and the times at which the second vehicle 210 was at each of the determined locations. The speed of the second vehicle 210 may be determined by solving for r using the formula $\Delta d_1 = \Delta r_1 \cdot \Delta t_1$. In this case, $\Delta d_1$ signifies distance between two locations of the second vehicle 210, $\Delta r_1$; signifies the average speed (rate) of the second vehicle 210 between those two locations, and $\Delta r_1$ signifies time between the two locations.

Alternately, if the internal computing device 230 knows the speed of the first vehicle 205 at one or multiple points in time (e.g., based on a speedometer of the sensors 225) and knows the distance between the first vehicle 205 and the second vehicle 210 while the first vehicle 205 at those same points in time (or within a range of them), the internal computing device 230 may determine the speed of the second vehicle 210 relative to the speed of the first vehicle 205. In some cases, the speed of the second vehicle 210 relative to the speed of the first vehicle 210 may be determined by solving for $\Delta r_2$ using the formula $\Delta d_2 = \Delta r_2 \cdot \Delta t_2$. In this case, $\Delta t_2$ signifies a difference between a first distance and a second distance. The first distance is a distance between the first vehicle 205 and the second vehicle measured by the sensors 225 at a first point in time. The second distance is a distance between the first vehicle 205 and the second vehicle measured by the sensors 225 at a second point in time. In this case, $\Delta t_2$ signifies a difference between the first point in time and the second point in time. In this case, $\Delta r_2$ signifies the difference between the speed of the first vehicle 205 and the speed of the second vehicle 210.

While the first vehicle 205, second vehicle 210, and third vehicle 215 are illustrated as automobiles, in some cases these vehicles may be other types of vehicles. For example, first vehicle 205, second vehicle 210, and/or the third vehicle 215 may be bicycles, wagons, scooters, motorbikes, motorcycles, automobiles, other land-based motor vehicles, trains, trams, trolleys, other railed vehicles, ships, boats, cruise liners, other watercraft, screw-propelled vehicles, hovercraft, other amphibious vehicles, airplanes, helicopters, other aircraft, or some combination thereof. While the thoroughfares of FIG. 2 are illustrated as roads, in some cases the thoroughfares may include waterways, airways, bike lanes, sidewalks, or some combination thereof.

Figure 3:
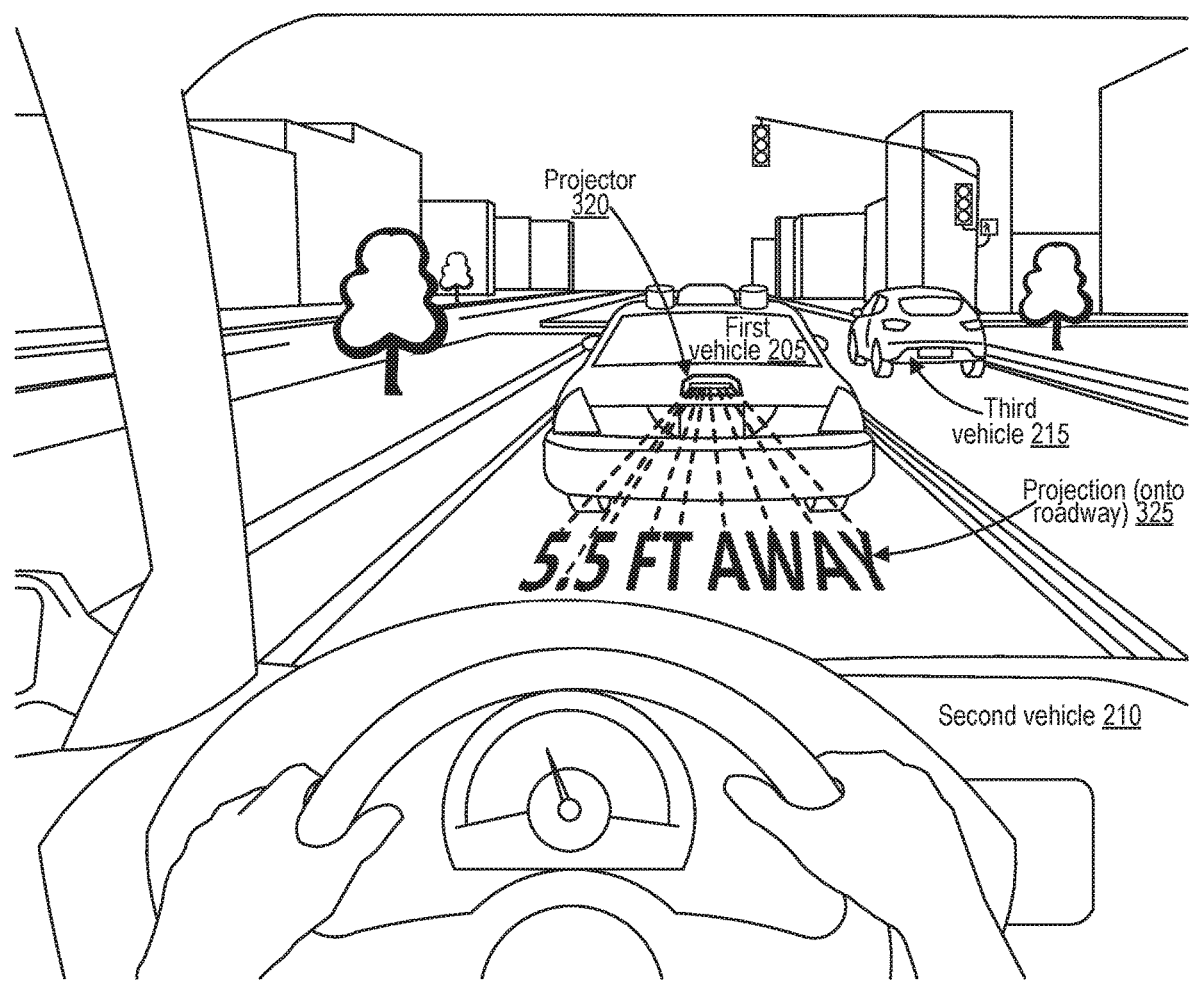
FIG. 3 illustrates a first vehicle outputting a visual alert to a second vehicle by projecting the alert onto a roadway surface using a projector.

FIG. 3 illustrates a first vehicle outputting a visual alert to a second vehicle by projecting the alert onto a roadway surface using a projector.

In particular, first vehicle 205, second vehicle 210, and third vehicle 215 of FIG. 2 are illustrated again in FIG. 3 on the same road environment as in FIG. 2. However, the first vehicle 205 in FIG. 3 lacks the display screen 220 that the first vehicle 205 had in FIG. 2, and instead includes a projector 320. The projector 320 outputs the same alert as the alert of FIG. 2—an alert indicating that the distance between the first vehicle 205 and the second vehicle is only 5.5 feet—but projects the alert as a projection 325 onto a surface of the roadway. Dashed lines are illustrated going from the projector 320 to the projection 325 to illustrate a path of light from the projector 320 to the projection 325. The path of light may or may not be visible to the operator of the second vehicle 210.

Figure 4:
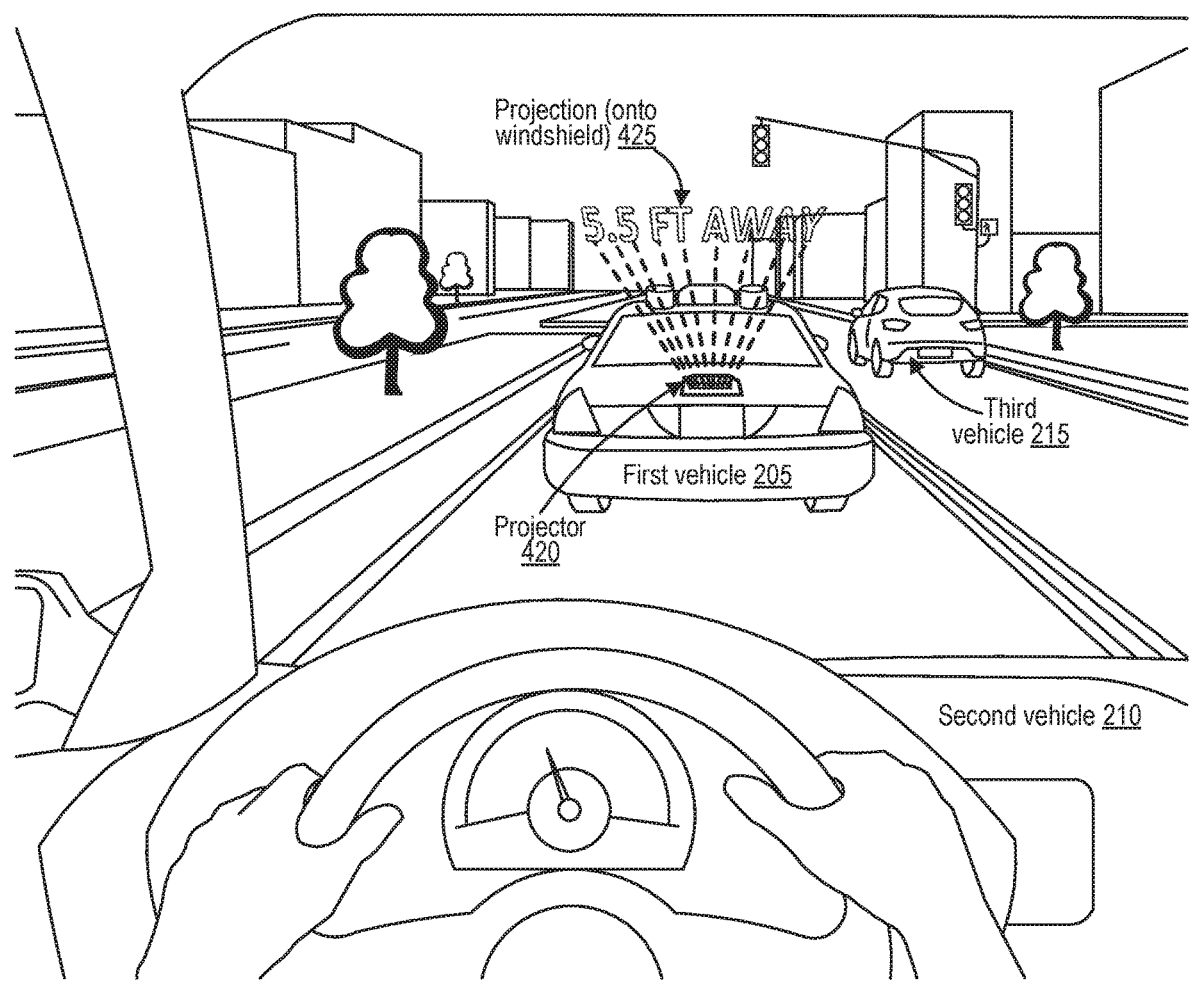
FIG. 4 illustrates a first vehicle outputting a visual alert to a second vehicle by projecting the alert onto a windshield of the second vehicle using a projector.

FIG. 4 illustrates a first vehicle outputting a visual alert to a second vehicle by projecting the alert onto a windshield of the second vehicle using a projector.

In particular, first vehicle 205, second vehicle 210, and third vehicle 215 of FIG. 2 are illustrated again in FIG. 4 on the same road environment as in FIG. 2. However, the first vehicle 205 in FIG. 4 lacks the display screen 220 that the first vehicle 205 had in FIG. 2, and instead includes a projector 420. The projector 320 outputs the same alert as the alert of FIG. 2—an alert indicating that the distance between the first vehicle 205 and the second vehicle is only 5.5 feet—but projects the alert as a projection 425 onto the windshield (or another window) of the second vehicle 210. Dashed lines are illustrated going from the projector 320 to the projection 325 to illustrate a path of light from the projector 320 to the projection 325. The path of light may or may not be visible to the operator of the second vehicle 210.

While the projector 320 of FIG. 3 and the projector 420 of FIG. 4 are illustrated projecting the alert onto a surface of the roadway and a surface of the windshield of the second vehicle 210, respectively, a projector of the first vehicle 205 may alternately or additionally project the alert onto a different surface instead. For example, a projector of the first vehicle 205 may project the alert onto a surface of the first vehicle, such as a rear bumper of the first vehicle.

The projector 320 of FIG. 3 and the projector 420 of FIG. 4 may use a variety of projection technologies, including laser projection, The projector may use projection mapping in combination with the sensors 225 to compensate for irregularly-shaped projection surfaces that are not flat. In particular, the sensors 225 (e.g., camera, RADAR, LIDAR, SONAR/SODAR) may capture visual and/or distance sensor measurements of a particular projection surface, the internal computing device 230 may determine a shape in 3D space of the projection surface based on the captured sensor measurements, the internal computing device 230 may run a projection mapping algorithm based on the determined shape of the projection surface to determine how the projection should be modified to appear legible given the shape of the projection surface, and the internal computing device 230 can send this modified projection of the alert to the projector 320/420, which projects the modified projection onto the projection surface. If the projection surface is a surface of the first vehicle 205, this projection mapping may only need to be performed once, for example following mounting of the sensors 225 on the first vehicle 205 and/or calibration of the sensors 225. In some cases, the projection mapping may be performed multiple times, even if the projection surface is a surface of the first vehicle 205, for example to accommodate slight changes to the shape of the first vehicle 205 over time due to modifications, repairs, rust and other chemical reactions, gravity, degradation, or other changes that occur over time. If the projection surface is a road surface, a surface of the second vehicle 210, or another surface in an environment in which the first vehicle 205 and the second vehicle 210 are located, then the projection mapping may be performed one or more times at each projection. Previous projection mappings onto similar projection surfaces may be used as a basis for later projection mappings.

In some cases, the sensors 225 may also be used to determine the distance and/or orientation of the second vehicle 210 relative the first vehicle 205 and/or to the surface and/or to the projector 320/420. In some cases, this may include determining a location of the second vehicle 210 in 3D space. Orientation may include compass direction (i.e., yaw), pitch, and/or roll. The internal computing device 230 may run a projection mapping algorithm and modify the projection so that the projection appears legible from the perspective of the second vehicle 210 and/or one or more occupants of the second vehicle 210 (e.g., the driver of the second vehicle 210) given the shape of the surface and the direction and orientation of the second vehicle 210 relative to the surface and/or to the first vehicle 205 and/or to the projector 320/420.

The first vehicle 205 of FIG. 2 only includes one visible display screen 220 that is illustrated as coupled to the rear windshield or window of the first vehicle 205 to be rear-facing to face a tailgating vehicle such as the second vehicle 210 of FIG. 2. Likewise, the first vehicle 205 of FIG. 3 and FIG. 4 each only include one projector 320/420 that is illustrated as coupled to a rear surface of the first vehicle to output a projection 325/425 that is rear-facing to face a tailgating vehicle such as the second vehicle 210 of FIG. 3 and FIG. 4. The display screen 220, projector 320, and projector 420 are examples of output devices. In some cases, the first vehicle 205 may include multiple output devices, one or more of which may be coupled to other portions of the first vehicle 205 than the rear windshield or window or other rear surface, and one or more of which may face another direction than the rear of the first vehicle 205. The first vehicle 205 may have one or more output devices coupled to its front and facing the front of the first vehicle 205, for example to output alerts to vehicles in front of the first vehicle 205 that operators of such vehicles might see through their rear view mirrors. The first vehicle 205 may have one or more output devices coupled to its left and/or right sides and facing the left and/or right sides of the first vehicle 205, for example to output alerts to vehicles to the left of and/or to the right of the first vehicle 205 that operators of such vehicles might see through their side windows. The first vehicle 205 may have one or more output devices coupled to its roof and/or undercarriage, which might face any direction, and which in some cases may be motorized and actuated by the internal computing device 230 to rotate to face the rear, the front, the left side, the right side, or a diagonal direction relative to the first vehicle 205 depending on a relative direction (e.g., compass direction) of the second vehicle 210 from the location of the first vehicle 205. In some cases, a font and/or message of the visual alert output by the output device may be modified based on the distance between the first vehicle 205 and the second vehicle 210. For example, if the second vehicle 210 is very close to the first vehicle 205, the alert may be longer and more detailed ("You are only 5.5 feet away from me, please slow down"), and a smaller font that is still legible at that distance may be used. On the other hand, if the second vehicle 210 is farther from the first vehicle 205, the alert may be shorter and less detailed ("SLOW DOWN, TOO CLOSE"), and a larger font that is still legible at that distance may be used.

In some cases, the sensors 225 may include one or more ambient light sensors that measure ambient light brightness measurements of the environment around the first vehicle 205. Alternately or additionally, the sensors 225 may include one or more cameras that capture images of at least a portion of the environment around the first vehicle 205, and the internal computing device 230 may generate ambient light measurements from images captured by the one or more cameras by averaging the brightness of at least a subset of pixels in the image. The brightness of the alert output by an output device may be adjusted based on the ambient light measurement. That is, a brightness of the display screen 220 may be adjusted based on the ambient light measurement, or the brightness of a projection 320/420 may be adjusted based on the ambient light measurement. For example, the alert may be output by the output device more brightly to still be visible during a sunny day where the environment is already bright, while the alert may be output by the output device more dimly during evening or nighttime where the environment is dark. Alternately, for certain types of output devices, such as those using electronic ink display screens, less brightness (e.g., little or no backlighting or frontlighting) may be used during a sunny day, while more brightness (e.g., increased backlighting or frontlighting) may be used during evening or nighttime. If the environment is rainy or foggy, the alert may be output by the output device more brightly to be clearly visible through the rain or fog.

Figure 5:
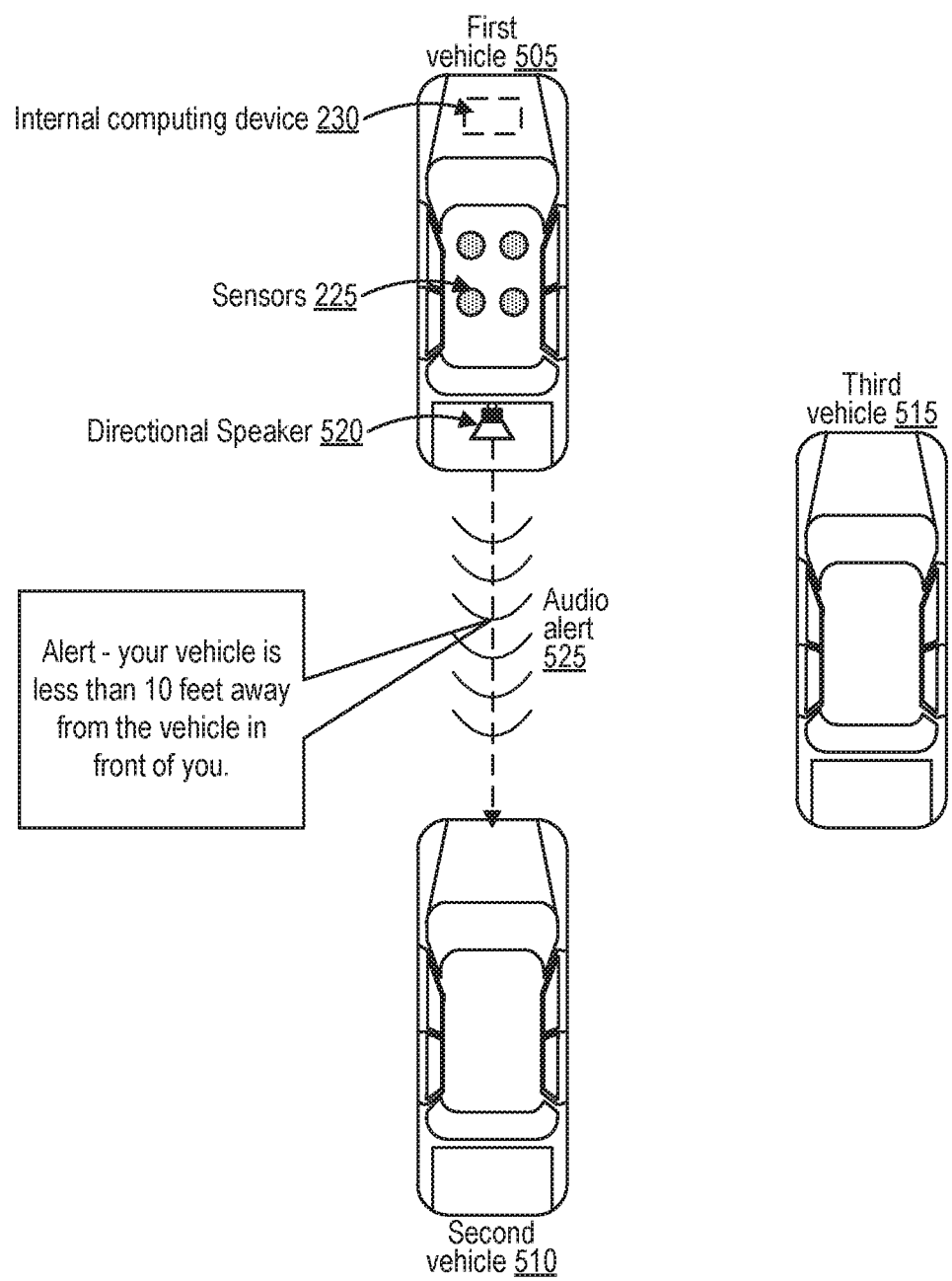
FIG. 5 illustrates a first vehicle outputting an audio alert to a second vehicle by playing the alert toward the second vehicle using a directional speaker.

FIG. 5 illustrates a first vehicle outputting an audio alert to a second vehicle by playing the alert toward the second vehicle using a directional speaker.

In particular, the first vehicle 505 of FIG. 5 is positioned in front of the second vehicle 510 of FIG. 5, with a similar relative positioning as the first vehicle 205 and the second vehicle 210 of FIG. 2. A third vehicle 515 is positioned to the side of the first vehicle 505 and the second vehicle 510. The first vehicle 505 and second vehicle 510 of FIG. 5 may be the same type of vehicles as the first vehicle 205 and the second vehicle 210 of FIG. 2, respectively, or may be different types of vehicles. For instance, the first vehicle 505 may include the same sensors 225 as the first vehicle 205 and/or alternate or additional sensors. The first vehicle 505 may include one or more internal computing devices 230, one of which is illustrated as a rectangle with dashed lines under the hood of the first vehicle 505 of FIG. 5.

Similarly to the situation illustrated in FIGS. 2-4, the internal computing device 230 of the first vehicle 505 of FIG. 5 identifies that a distance between the first vehicle 505 and the second vehicle 510 is unsafely low based on measurements from the sensors 230, for example below a safe distance threshold. The first vehicle 505 includes a directional speaker 520. Instead of or in addition to generating and outputting visual alerts as in FIGS. 2-4, the internal computing device 230 of FIG. 5 generates an audio alert 525, for example via a text-to-speech algorithm, and outputs the audio alert 525 to the second vehicle 510, for example using the directional speaker 520. In the example of FIG. 5, the audio alert 525 is an audio track in which a synthesized voice states "Alert—your vehicle is less than 10 feet away from the vehicle in front of you." In this example, 10 feet may be a safe distance threshold. The driver and/or passengers of the second vehicle 510 may then receive (hear) the audio alert 525 and recognize the need to slow the second vehicle 510 down so as to provide a safer driving environment. In some cases, the audio alert 525 may include a non-voice noise instead of, or in addition to, the synthesized voice. In some cases, a pre-recorded human voice may be used instead of, or in addition to, a synthesized voice.

By using a directional speaker 520 to output the audio alert 525, drivers and/or passengers in vehicles other than the second vehicle 510—such as the third vehicle 515—do not receive (hear) the audio alert 525, which mitigates the potential for confusion that output of an audio alert 525 might cause if vehicles other than the intended target can hear the audio alert 525. However, in some cases, the horn of the vehicle, or a non-directional speaker, may be used to output an audio alert 525, for example in very low traffic situations where only one other vehicle is located within a predetermined radius of the first vehicle 505, or in urgent situations in which a vehicular accident may be imminent and the internal computing device 230 determines that taking time for the directional speaker 520's directional analysis may be inefficient and may increase the risk of a vehicular accident.

In some cases, the audio alert 525 may be referred to as an auditory alert, a vocal alert, a speech alert, a speaker alert, a noise alert, or some combination thereof.

Figure 6:
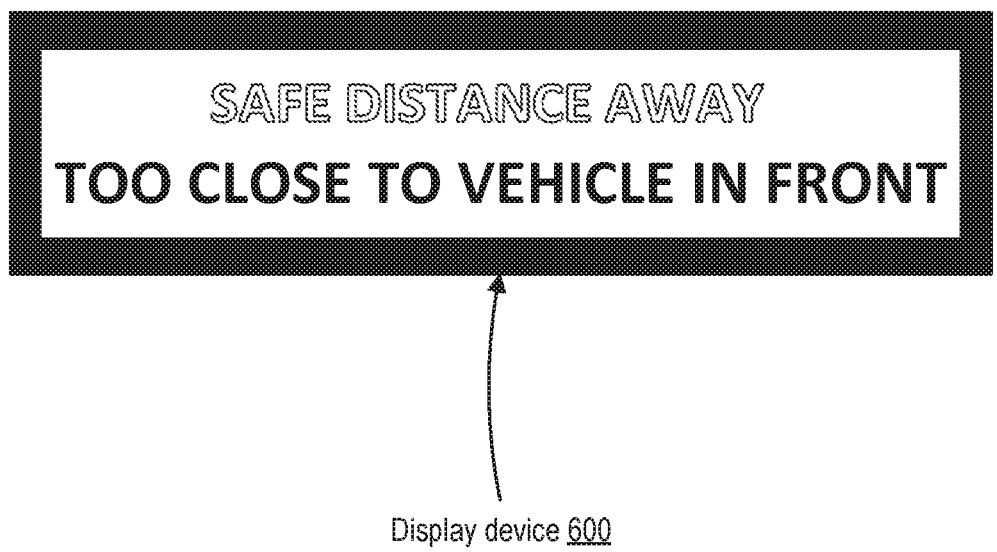
FIG. 6 illustrates a display device for displaying a visual alert based on distance between a first vehicle and a second vehicle, the display device having a first "safe" state and second "unsafe" state corresponding to the alert.

FIG. 6 illustrates a display device for displaying a visual alert based on distance between a first vehicle and a second vehicle, the display device having a first "safe" state and second "unsafe" state corresponding to the alert.

In particular, the display device 600 is an example of a type of output device for outputting a visual alert. The display device 600 may be used by the first vehicle 205 of FIG. 2 in place of or in addition to the display screen 220 in FIG. 2, for example. The display device 600 includes two light sources. The first light source is positioned under a first "safe" message ("SAFE DISTANCE AWAY") that the display device 600 illuminates when the distance between the first vehicle 205 and the second vehicle 210 as determined based on sensor measurements from the sensors 225 is equal to or greater than the safe distance threshold. The second light source is positioned under a second "unsafe" message ("TOO CLOSE TO VEHICLE IN FRONT") that the display device 600 illuminates when the distance between the first vehicle 205 and the second vehicle 210 as determined based on sensor measurements from the sensors 225 is less than the safe distance threshold.

At any given time, either the first "safe" message is illuminated, the second "unsafe" message is illuminated, or neither is illuminated (e.g., if there are no vehicles behind or otherwise in the vicinity of the first vehicle 205). For example, in the display device 600 of FIG. 6, the second "unsafe" message is illustrated with black filled-in text while the first "safe" message is illustrated with white text outlined in black, indicating that the second "unsafe" message is illuminated while the first "safe" message is not illuminated. In some cases, the first "safe" message may be removed entirely, in which case no message being illuminated indicates the first "safe" state. In some, cases, the first "safe" message and/or the second "unsafe" message may identify the safe threshold distance being used (e.g., "DISTANCE>10 FT" and "DISTANCE<10 FT"). In some cases, symbols and/or colors may be displayed instead, of, or in addition to, the first "safe" message and/or the second "unsafe" message. For example, first "safe" message may be illuminated in green or blue, while the second "unsafe" message may be illuminated in red. The display device 600 may be cheaper to produce, and may use less power, than a display screen in which each pixel's output can be customized, but may still convey similar information.

Figure 7:
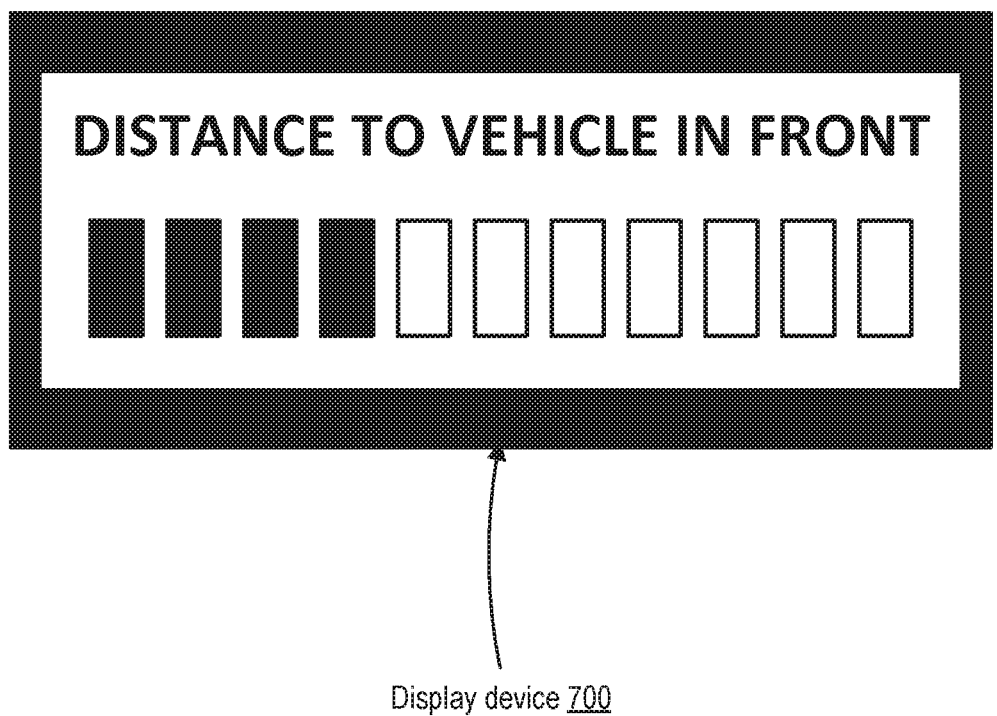
FIG. 7 illustrates a display device for displaying a visual alert based on distance between a first vehicle and a second vehicle, the alert including a visual representation of the distance.

FIG. 7 illustrates a display device for displaying a visual alert based on distance between a first vehicle and a second vehicle, the alert including a visual representation of the distance.

In particular, the display device 700 is an example of a type of output device for outputting a visual alert. The display device 700 may be used by the first vehicle 205 of FIG. 2 in place of or in addition to the display screen 220 in FIG. 2, for example. The display device 700 includes a segmented meter symbolically representing distance between the first vehicle 205 and the second vehicle 110. The segmented meter illustrated in the display device 700 includes eleven segments, four of which are illustrated as filled in with black, representing being illuminated, and seven of which are illustrated as filled in with white, representing not being illuminated. As the distance between the first vehicle 205 and the second vehicle 110 decreases, the number of illuminated segments may decrease sequentially to the left. As the distance between the first vehicle 205 and the second vehicle 110 increases, the number of illuminated segments may increase sequentially to the right.

Alternately, as the distance between the first vehicle 205 and the second vehicle 110 decreases, the number of illuminated segments may increase sequentially to the right. As the distance between the first vehicle 205 and the second vehicle 110 increases, the number of illuminated segments may decrease sequentially to the left.

In some cases, a portion of the display device 700 may flash and/or change illumination colors whenever the distance between the first vehicle 205 and the second vehicle 110 falls below the safe threshold distance.

In some cases, simpler display devices such as the display device 600 or the display device 700 may use LCD displays.

Figure 8:
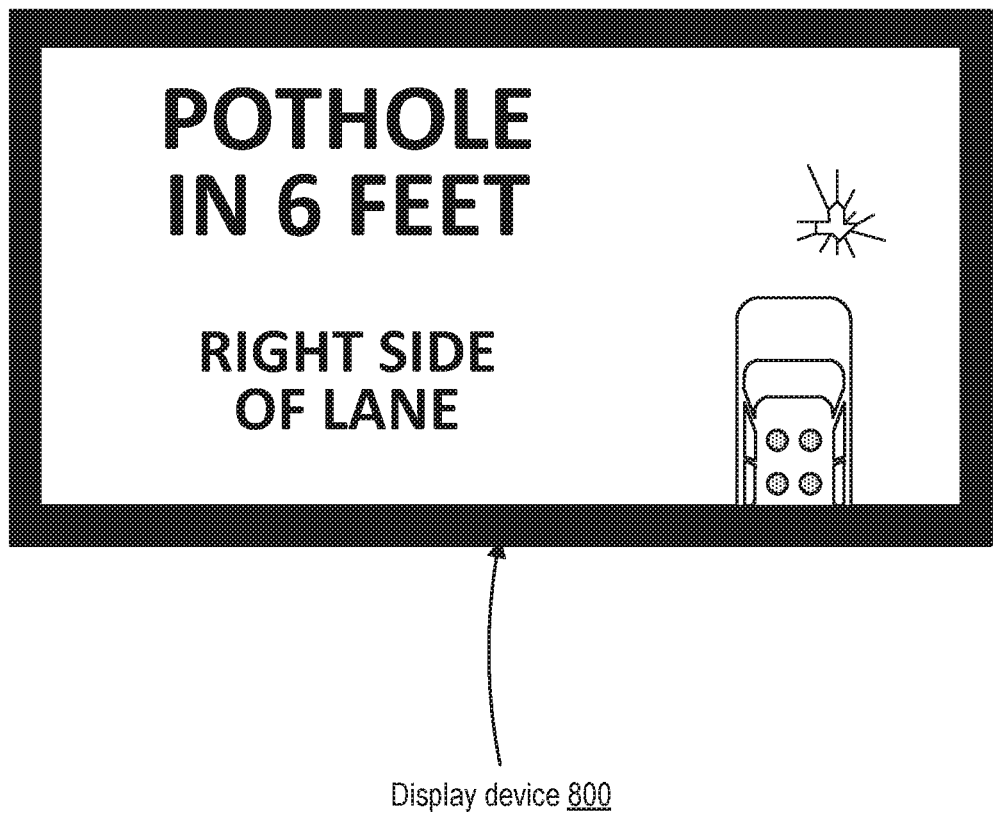
FIG. 8 illustrates a display device for displaying a visual alert identifying detection by a first vehicle of a pothole hazard that represents a risk to a second vehicle.

FIG. 8 illustrates a display device for displaying a visual alert identifying detection by a first vehicle of a pothole hazard that represents a risk to a second vehicle.

In particular, the display device 800 is an example of a type of output device for outputting a visual alert. The display device 800 may be used by the first vehicle 205 of FIG. 2, and may be an example of the display screen 220 of FIG. 2.

Instead of providing information to the second vehicle 210 based on the distance between the first vehicle 205 and the second vehicle 210, the display device 800 provides information about a pothole hazard detected by the first vehicle 205. The sensors 225 of the first vehicle 205 may detect a hazard, such as a pothole, along the road, that the driver and/or passengers of the second vehicle 210 may be unaware of. For example, if the second vehicle is 210 is behind the first vehicle, a line of sight of the pothole for the driver and/or passengers of the second vehicle 210 may be blocked by the first vehicle 205. To alleviate the risk to the second vehicle 210, which in turn alleviates road risk for all vehicles on the road with the second vehicle 210, the alert output by the display device 800 of the first vehicle 205 may identify the detected location of the pothole or other hazard, which in the example of FIG. 8 is in 6 feet on the right-hand side of the lane in which the first vehicle 205 and second vehicle 210 are driving. An image of the pothole relative to the first vehicle 205 and/or the second vehicle 210 may also be output by the display device 800 so as to alert the driver regardless of language.

Figure 9:
FIG. 9 illustrates a display device for displaying a visual alert identifying detection by a first vehicle of a bicycle in a blind spot of a second vehicle.

FIG. 9 illustrates a display device for displaying a visual alert identifying detection by a first vehicle of a bicycle in a blind spot of a second vehicle.

In particular, the display device 900 is an example of a type of output device for outputting a visual alert. The display device 900 may be used by the first vehicle 205 of FIG. 2, and may be an example of the display screen 220 of FIG. 2.

The sensors 225 of the first vehicle 205 may detect a mobile hazard, such as a bicycle, along the road, that the driver and/or passengers of the second vehicle 210 may be unaware of, for example because the bicycle is in a blind spot of the second vehicle 210. To alleviate the risk to the second vehicle 210 and to the bicyclist, which in turn alleviates road risk for all vehicles on the road with the second vehicle 210 and the bicycle, the alert output by the display device 900 of the first vehicle 205 may identify the detected location of the bicycle relative to the second vehicle 210, which in the example of FIG. 9 is on the right-hand side of the second vehicle 210. An image of the bicycle relative to the second vehicle 210 may also be output by the display device 900 so as to alert the driver regardless of language.

Figure 10:
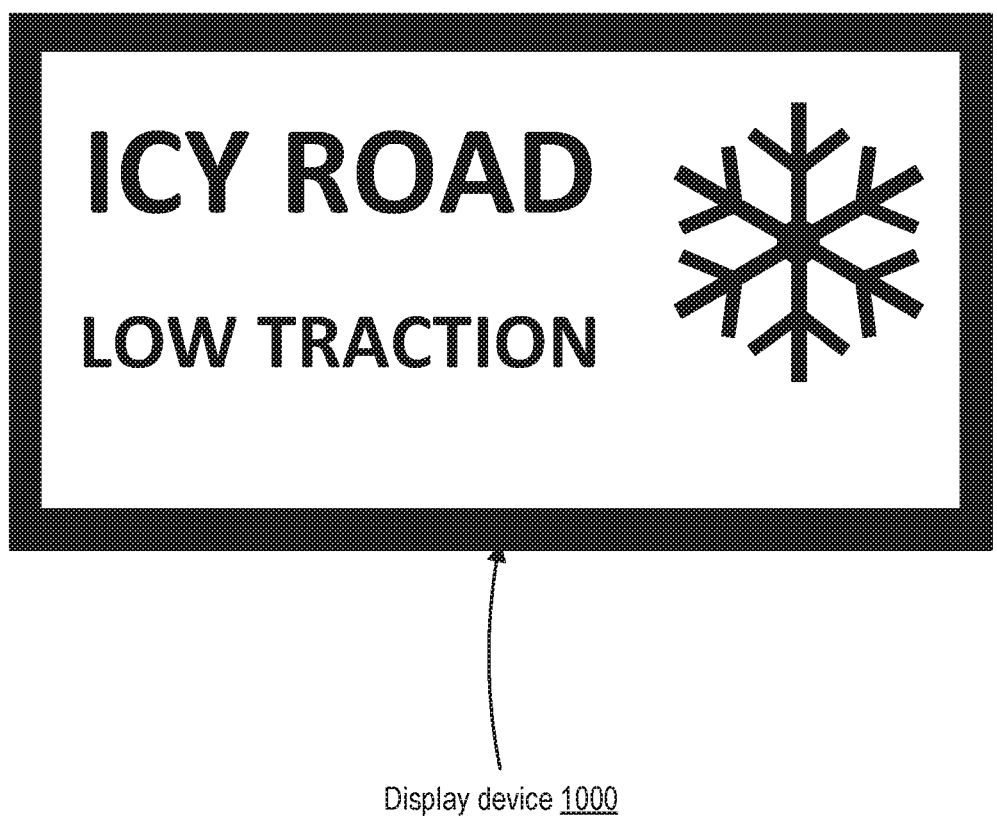
FIG. 10 illustrates a display device for displaying a visual alert identifying detection by a first vehicle of icy road conditions that may reduce tire traction for a second vehicle.

FIG. 10 illustrates a display device for displaying a visual alert identifying detection by a first vehicle of icy road conditions that may reduce tire traction for a second vehicle.

In particular, the display device 1000 is an example of a type of output device for outputting a visual alert. The display device 1000 may be used by the first vehicle 205 of FIG. 2, and may be an example of the display screen 220 of FIG. 2.

The sensors 225 of the first vehicle 205 may detect a road condition based hazard, such as icy road conditions, along the road, that the driver and/or passengers of the second vehicle 210 may be unaware of, for example the icy road condition might not be clearly visible. To alleviate the risk to the first vehicle 205 and/or second vehicle 210 and/or other vehicles on the road, the alert output by the display device 1000 of the first vehicle 205 may identify icy road condition. An image of a snowflake or other representation of the detected road condition may also be output by the display device 1000 so as to alert the driver regardless of language.

Figure 11:
FIG. 11 illustrates a display device for displaying a visual alert identifying that a first vehicle plans to turn onto a particular street that is a particular distance away.

FIG. 11 illustrates a display device for displaying a visual alert identifying that a first vehicle plans to turn onto a particular street that is a particular distance away.

In particular, the display device 1100 is an example of a type of output device for outputting a visual alert. The display device 1100 may be used by the first vehicle 205 of FIG. 2, and may be an example of the display screen 220 of FIG. 2.

The internal computing device 230 may identify that the first vehicle 205 is planning to take a particular planned route, for example based on a generated or requested route to a destination address input and/or requested by the driver and/or passengers of the first vehicle 205. Along the planned route may be a particular, action, such as the right turn in 15 meters (m) on Baltic Avenue identified as an example on th display device 1100 of FIG. 11. To alleviate the risk to the first vehicle 205 and/or second vehicle 210 and/or other vehicles on the road of a collision due to an unexpected action taken by the first vehicle 205, the alert output by the display device 1000 of the first vehicle 205 may identify one or more planned actions on the display device 1100. This may provide more detailed information than a blinker light or other indicator, which may make a difference in road safety. An image of one or more planned actions by the first vehicle 205 on a map may also be by the display device 1100 so as to alert the driver regardless of language.

Figure 12:
FIG. 12 illustrates a display device for displaying a visual alert identifying detection by a first vehicle of pedestrians ahead of the first vehicle, the visual alert including an image or video from a camera of the first vehicle.

FIG. 12 illustrates a display device for displaying a visual alert identifying detection by a first vehicle of pedestrians ahead of the first vehicle, the visual alert including an image or video from a camera of the first vehicle.

In particular, the display device 1200 is an example of a type of output device for outputting a visual alert. The display device 1200 may be used by the first vehicle 205 of FIG. 2, and may be an example of the display screen 220 of FIG. 2.

The sensors 225 of the first vehicle 205 may detect a road hazard, such as one or more pedestrians crossing the road, that the driver and/or passengers of the second vehicle 210 may be unaware of, for example if the second vehicle 210 is behind the first vehicle 205 and the line of sight from the second vehicle 210 to the pedestrians is blocked by the first vehicle. To alleviate the risk to the first vehicle 205 and/or second vehicle 210 and/or the pedestrians and/or other vehicles on the road, the alert output by the display device 1200 of the first vehicle 205 may include camera footage showing live images/videos of the pedestrians as captured by one or more cameras of the sensors 225 of the first vehicle 205.

Figure 13:

FIG. 13 illustrates a display device for displaying a visual alert identifying a defect with a second vehicle that is detected by the first vehicle and that an operator of the second vehicle may be unaware of.

In particular, the display device 1300 is an example of a type of output device for outputting a visual alert. The display device 1300 may be used by the first vehicle 205 of FIG. 2, and may be an example of the display screen 220 of FIG. 2.

The sensors 225 of the first vehicle 205 may detect a defect with the second vehicle 210, such as a broken headlight or taillight visible using camera(s) of the sensors 225, or smoke emanating from a portion of the second vehicle 210 visible using camera(s) of the sensors 225, or an unusual mechanical noise heard by one or more microphone(s) of the sensors 225, that the driver and/or passengers of the second vehicle 210 may be unaware of, as the issue might not be visible or audible from within the second vehicle 210. To alleviate the risk to the first vehicle 205 and/or second vehicle 210 and/or other vehicles on the road, the alert output by the display device 1000 of the first vehicle 205 may identify the defect, which in the example of FIG. 13 is a disabled left headlight. An image representing the defect, such as the crossed-out light bulb of FIG. 13, may also be output by the display device 1300 so as to alert the driver regardless of language.

Figure 14:
FIG. 14 illustrates a display device for displaying a visual alert identifying a defect with a first vehicle that may affect a second vehicle.

FIG. 14 illustrates a display device for displaying a visual alert identifying a defect with a first vehicle that may affect a second vehicle.

In particular, the display device 1400 is an example of a type of output device for outputting a visual alert. The display device 1400 may be used by the first vehicle 205 of FIG. 2, and may be an example of the display screen 220 of FIG. 2.

The sensors 225 of the first vehicle 205 may detect a defect with the first vehicle 205, such as a brake malfunction or other issue, that the driver and/or passengers of the second vehicle 210 may be unaware of, as the issue might not be visible or audible from within the second vehicle 210. To alleviate the risk to the first vehicle 205 and/or second vehicle 210 and/or other vehicles on the road, the alert output by the display device 1400 of the first vehicle 205 may identify the defect, which in the example of FIG. 14 is a brake malfunction. An image representing the defect may also be output by the display device 1400 so as to alert the driver regardless of language.

FIG. 15 illustrates a display device for displaying a visual alert identifying that a first vehicle is driving slowly because the first vehicle is carrying fragile goods.

In particular, the display device 1500 is an example of a type of output device for outputting a visual alert. The display device 1500 may be used by the first vehicle 205 of FIG. 2, and may be an example of the display screen 220 of FIG. 2.

The internal computing device 230 of the first vehicle 205 may identify that the first vehicle 205 will be driving slowly or erratically due to its cargo, which may for example include fragile goods or passengers with medical issues (e.g., passenger heading urgently to hospital due to pregnancy, labor, injury, etc.). The driver and/or passengers of the second vehicle 210 may otherwise be unaware of such an issue. To alleviate the risk to the first vehicle 205 and/or second vehicle 210 and/or other vehicles on the road, the alert output by the display device 1500 of the first vehicle 205 may identify the issue, which in the example of FIG. 15 is that the first vehicle 205 is carrying fragile goods. An image representing the issue may also be output by the display device 1500, such as the broken glass of FIG. 15, so as to alert the driver regardless of language.

Figure 16:
FIG. 16 illustrates a display device for displaying a visual alert identifying that a second vehicle should stop because an accident is imminent.
Figure 16:

FIG. 16 illustrates a display device for displaying a visual alert identifying that a second vehicle should stop because an accident is imminent.

In particular, the display device 1600 is an example of a type of output device for outputting a visual alert. The display device 1600 may be used by the first vehicle 205 of FIG. 2, and may be an example of the display screen 220 of FIG. 2.

The internal computing device 230 of the first vehicle 205 may identify that the first vehicle 205 and/or second vehicle 210 are likely to be in an accident imminently, in a situation where the accident may be unavoidable or unlikely to avoid due to a sudden change in road conditions, such as a vehicle ahead of the first vehicle 205 spinning out of control. The driver and/or passengers of the second vehicle 210 may otherwise be unaware of such an issue. To alleviate the risk to the first vehicle 205 and/or second vehicle 210 and/or other vehicles on the road, the alert output by the display device 1500 of the first vehicle 205 may identify that the second vehicle 205 should urgently stop to prevent or mitigate damage from the impending accident. An image representing the issue may also be output by the display device 1600 so as to alert the driver regardless of language.

Figure 17:
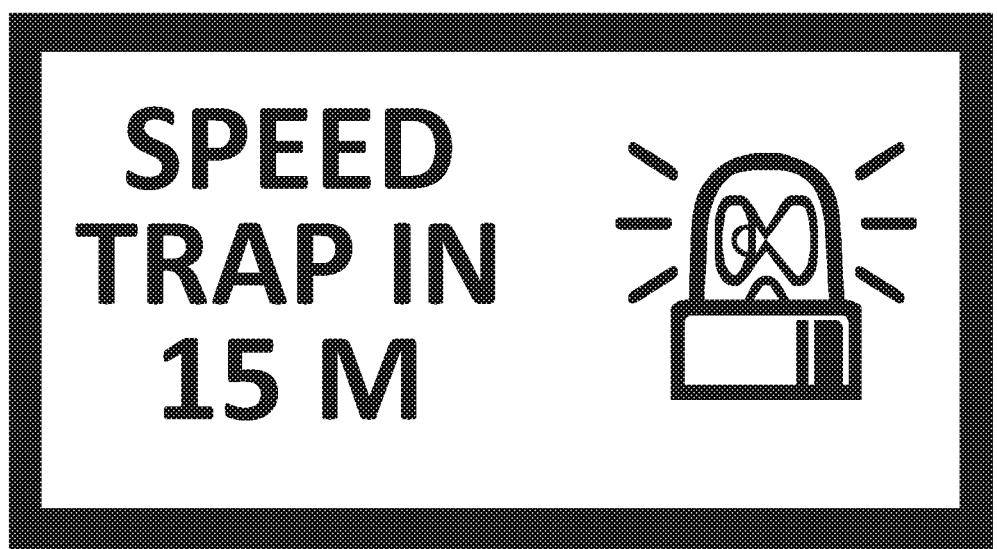
FIG. 17 illustrates a display device for displaying a visual alert identifying detection by a first vehicle of a speed trap that may affect a second vehicle.

FIG. 17 illustrates a display device for displaying a visual alert identifying detection by a first vehicle of a speed trap that may affect a second vehicle.

In particular, the display device 1700 is an example of a type of output device for outputting a visual alert. The display device 1700 may be used by the first vehicle 205 of FIG. 2, and may be an example of the display screen 220 of FIG. 2.

In regions of the world in which sensors that detect speed traps are legal, the sensors 225 may include such sensors. The sensors 225 (e.g., camera and/or RADAR and/or LIDAR and/or dedicated speed trap detecting sensor) of the first vehicle 205 may detect a speed trap that the driver and/or passengers of the second vehicle 210 may be unaware of, for example if the second vehicle 210 is behind the first vehicle 205 and the line of sight from the second vehicle 210 to the speed trap is blocked by the first vehicle. In regions of the world in which sensors that detect speed traps are legal, to alleviate a risk of the second vehicle 210 being pulled over for speeding, the alert output by the display device 1500 of the first vehicle 205 may identify detection of the speed trap, and may identify a distance away in the example of FIG. 17, which indicates that the speed trap is 15 m away from the first vehicle 205 and/or from the second vehicle 210. An image representing the speed trap, such as a siren, may also be output by the display device 1700 so as to alert the driver regardless of language.

Figure 18:
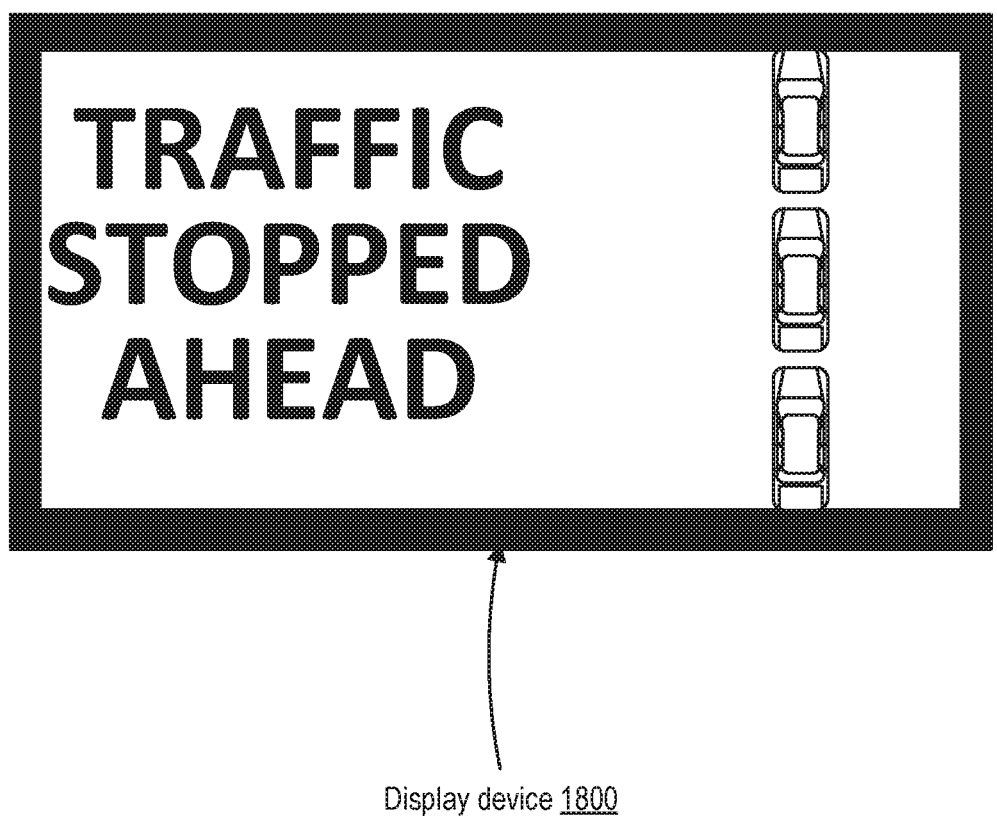
FIG. 18 illustrates a display device for displaying a visual alert identifying that traffic is stopped ahead of a first vehicle to notify a second vehicle as to the reason that the first vehicle is stopped.

FIG. 18 illustrates a display device for displaying a visual alert identifying that traffic is stopped ahead of a first vehicle to notify a second vehicle as to the reason that the first vehicle is stopped.

In particular, the display device 1800 is an example of a type of output device for outputting a visual alert. The display device 1800 may be used by the first vehicle 205 of FIG. 2, and may be an example of the display screen 220 of FIG. 2.

The internal computing device 230 of the first vehicle 205 may detect that traffic is stopped ahead of the first vehicle 205, for example based on detecting that the first vehicle 205 is stopped, that map-based traffic information received from a network data source indicates traffic in the region in which the first vehicle 205 is located, and/or based on the sensors 225 detecting stopped vehicles ahead of the first vehicle 205. The driver and/or passengers of the second vehicle 210 may be unaware of the traffic stopped ahead of the first vehicle 205. For example, if the first vehicle 205 is a large truck or bus and the second vehicle 210 is behind the first vehicle 205 on a road in which only a single lane is moving in the direction that the first vehicle 205 and second vehicle 210 are driving, the driver and/or passengers of the second vehicle 210 may not be able to see over or around the first vehicle 205. Without more information, the driver and/or passengers of the second vehicle 210 may think that the first vehicle 205 is stopped for another reason, and may dangerously attempt to pass the first vehicle 205 in a wrong-way lane of the road, only to be unable to return to the lane driving in the correct direction. To alleviate the risk to the first vehicle 205 and/or second vehicle 210 and/or other vehicles on the road, the alert output by the display device 1800 of the first vehicle 205 may identify that there is traffic stopped ahead of the first vehicle 205. An image representing the traffic may also be output by the display device 1800 so as to alert the driver regardless of language.

Figure 19:
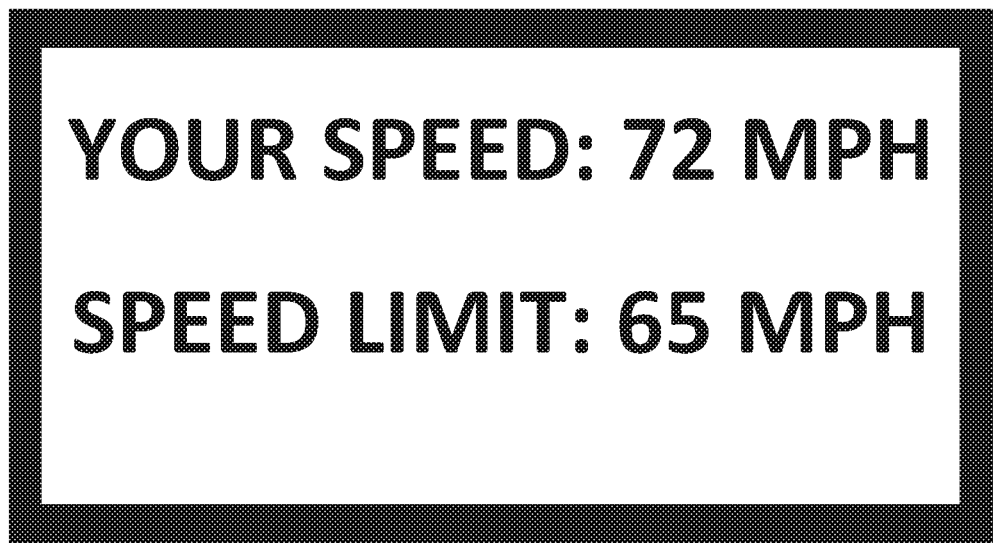
FIG. 19 illustrates a display device for displaying a visual alert identifying a speed limit in comparison to a speed of a second vehicle as determined by the first vehicle.

FIG. 19 illustrates a display device for displaying a visual alert identifying a speed limit in comparison to a speed of a second vehicle as determined by the first vehicle.

In particular, the display device 1900 is an example of a type of output device for outputting a visual alert. The display device 1900 may be used by the first vehicle 205 of FIG. 2, and may be an example of the display screen 220 of FIG. 2.

The internal computing device 230 of the first vehicle 205 may, based on sensor measurements from the sensors 225, determine the speed of the second vehicle 210. The internal computing device 230 of the first vehicle 205 may, based on sensor measurements from the sensors 225 (e.g., detection of a speed limit sign via a camera and interpretation of the speed limit from the speed limit sign via optical character recognition) and/or based on speed limit information received from map-based network data source, determine a speed limit on the road on which the first vehicle 205 and second vehicle 210 are traveling and/or in the region in which the first vehicle 205 and second vehicle 210 are traveling. Particularly, if the second vehicle 210 is driving faster than the speed limit, or faster than the speed limit by at least a threshold speed amount, the alert output by the display device 1000 of the first vehicle 205 may identify the detected speed of the second vehicle 210 and/or the speed limit. This may encourage the driver of the second vehicle 210 to slow down to alleviate the risk to the first vehicle 205 and/or second vehicle 210 and/or other vehicles on the road. For example, in the example of FIG. 19, the detected speed of the second vehicle 210 is 72 mph, while the speed limit is 65 mph. An image, such as an image of a speed limit sign or of a speeding vehicle, may also be output by the display device 1900 so as to alert the driver regardless of language.

Figure 20:
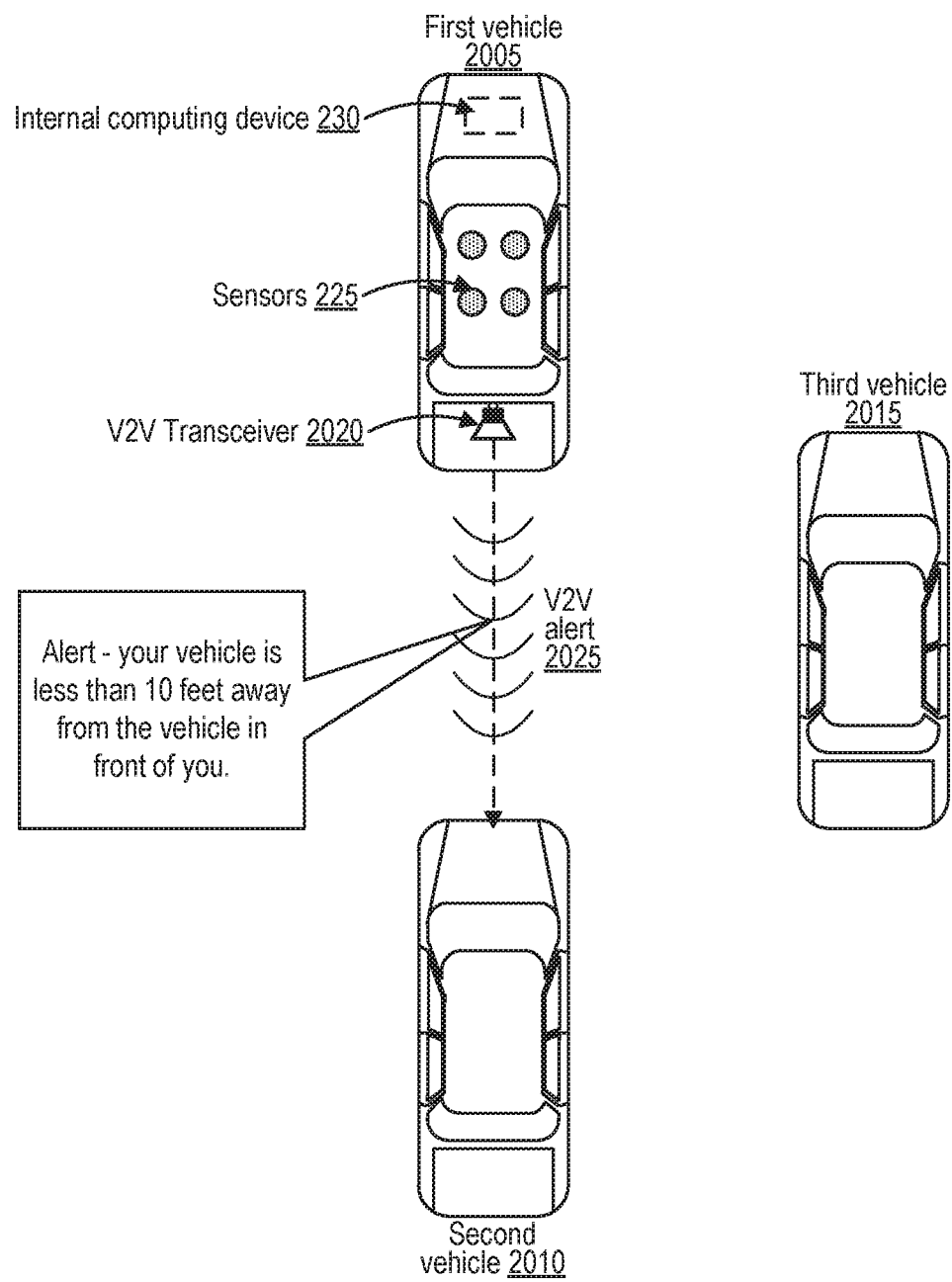
FIG. 20 illustrates a first vehicle outputting a vehicle-to-vehicle (V2V) alert to a second vehicle by transmitting the alert wirelessly toward the second vehicle using a wireless V2V transceiver.

FIG. 20 illustrates a first vehicle outputting a vehicle-to-vehicle (V2V) alert to a second vehicle by transmitting the alert wirelessly toward the second vehicle using a wireless V2V transceiver.

In particular, the first vehicle 2005 of FIG. 20 is positioned in front of the second vehicle 2010 of FIG. 20, with a similar relative positioning as the first vehicle 205 and the second vehicle 210 of FIG. 2, and the first vehicle 505 and the second vehicle 510 of FIG. 5. A third vehicle 2015 is positioned to the side of the first vehicle 2005 and the second vehicle 2010. The first vehicle 2005 and second vehicle 2010 of FIG. 20 may be the same type of vehicles as the first vehicle 205 and the second vehicle 210 of FIG. 2, respectively, or may be different types of vehicles. For instance, the first vehicle 2005 may include the same sensors 225 as the first vehicle 205 and/or alternate or additional sensors. The first vehicle 2005 may include one or more internal computing devices 230, one of which is illustrated as a rectangle with dashed lines under the hood of the first vehicle 2005 of FIG. 20.

Similarly to the situation illustrated in FIGS. 2-4, the internal computing device 230 of the first vehicle 2005 of FIG. 20 identifies that a distance between the first vehicle 2005 and the second vehicle 2010 is unsafely low based on measurements from the sensors 230, for example below a safe distance threshold. The first vehicle 2005 includes a vehicle-to-vehicle (V2V) communication transceiver, which may use a short-range wireless communication protocol, such as Bluetooth or dedicated short-range radio communication (DSRC), or another wireless communication protocol such as a cellular or WLAN communication protocol. Instead of or in addition to generating and outputting visual alerts as in FIGS. 2-4 and/or the audio alerts of FIG. 5, the internal computing device 230 of FIG. 20 generates a V2V alert 2025 and transmits the audio alert 2025 to the second vehicle 2010, for example using the V2V transceiver 2020. In the example of FIG. 20, the V2V alert 2025 includes text reading "Alert—your vehicle is less than 10 feet away from the vehicle in front of you." In this example, 10 feet may be a safe distance threshold. The V2V alert 2025 may include, text, images, videos, and/or audio. The second vehicle 2010 may then receive the V2V alert 2025 via a V2V transceiver of the second vehicle 2010, and the second vehicle 2010 may alert the driver and/or passengers of the second vehicle 2010 of the V2V alert 2025. The driver and/or passengers of the second vehicle 2010 may then recognize the need to slow the second vehicle 2010 down so as to provide a safer driving environment.

Figure 21:
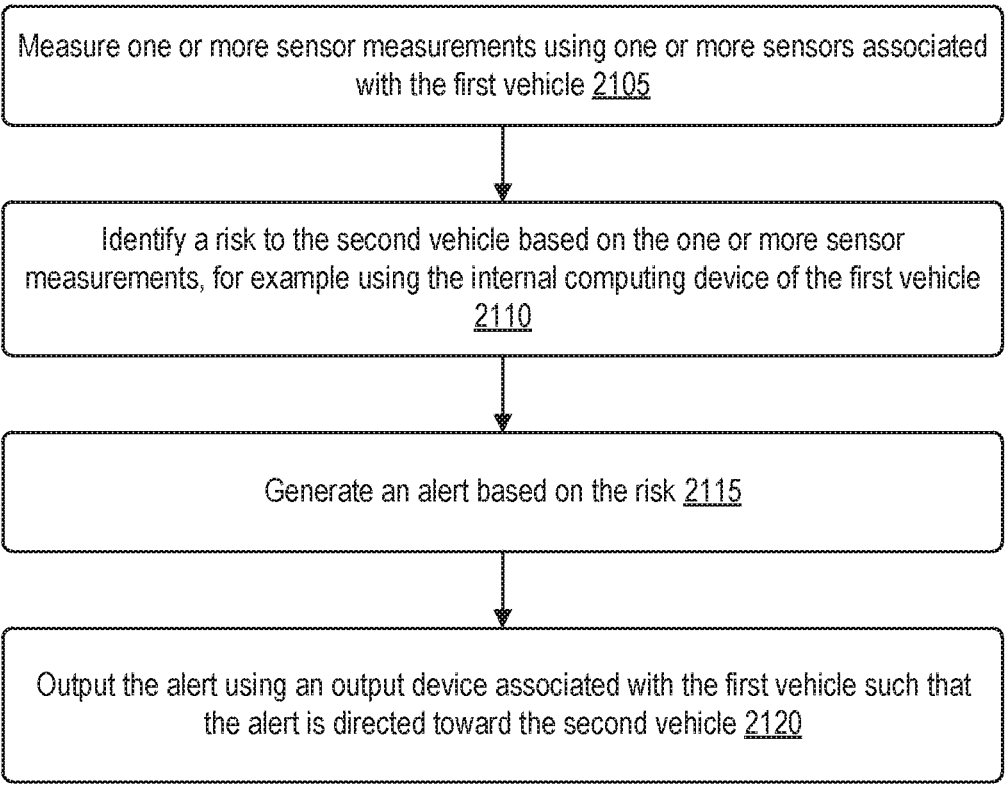
FIG. 21 is a flow diagram illustrating techniques for inter-vehicle communication between a first vehicle and a second vehicle.

FIG. 21 is a flow diagram illustrating techniques for inter-vehicle communication between a first vehicle and a second vehicle.

The flow diagram 2100 of FIG. 21 illustrates a process for inter-vehicle communication between a first vehicle and a second vehicle. The process may be performed by one or more devices included in and/or coupled to the first vehicle, such as sensors and/or an internal computing device and/or an output device of the first vehicle. These devices are referred to below collectively simply as "the first vehicle." The first vehicle with respect to the flow diagram 2100 may be, for example, the autonomous vehicle 102 of FIG. 1, the first vehicle 205 of FIG. 2-4, the first vehicle 505 of FIG. 5, or the first vehicle 2005 of FIG. 20. The second vehicle with respect to the flow diagram 2100 may be, for example, the autonomous vehicle 102 of FIG. 1, the second vehicle 210 of FIG. 2-4, the second vehicle 510 of FIG. 5, or the second vehicle 2010 of FIG. 20.

At step 2105, the first vehicle measures one or more sensor measurements using one or more sensors associated with the first vehicle. At step 2110, the first vehicle identifies a risk to the second vehicle based on the one or more sensor measurements, for example using the internal computing device of the first vehicle. At step 2115, the first vehicle generates an alert based on the risk, for example using the internal computing device of the first vehicle. At step 2120, the first vehicle outputs the alert using an output device associated with the first vehicle such that the alert is directed toward the second vehicle.

In some cases, the output device includes a display screen 220, and outputting the alert using the output device includes displaying the alert using a display screen while the display screen is facing the second vehicle. In some cases, the output device includes a projector 320/420, and outputting the alert using the output device includes projecting the alert onto a surface using the projector. The first vehicle and the second vehicle may be positioned on the surface (e.g., the surface is a road surface as in FIG. 3) while the alert is projected onto the surface. The surface may be a portion of the first vehicle. The surface may be a portion of the second vehicle (e.g., the projection 425 onto the windshield of the second vehicle 210 of FIG. 4).

In some cases, the internal computing device of the first vehicle identifies a distance between the first vehicle and the second vehicle based on the one or more sensor measurements, identifying the risk to the second vehicle includes identifying that the distance is below a safe threshold distance, and the alert is based on the distance. The alert may identify the distance. The alert may identify that the distance is below the safe threshold distance.

In some cases, the internal computing system of the first vehicle may determine a speed of the first vehicle, determine a speed of the second vehicle (e.g., based on the one or more sensor measurements and/or the speed of the first vehicle), and determine the safe threshold distance based on the speed of the first vehicle and the speed of the second vehicle. The internal computing system of the first vehicle may determine an environmental condition of an environment in which the first vehicle and second vehicle are located (e.g., based on sensor measurements) and determine the safe threshold distance based on the environmental condition. The internal computing system of the first vehicle may determine a vehicle type of the second vehicle (e.g., based on one or more images captured by a camera, wherein the one or more sensor measurements include the one or more images and the one or more sensors include the camera) and determine the safe threshold distance based on the vehicle type of the second vehicle. In some cases, the one or more sensors may include a light detection and ranging (LIDAR) sensor, the one or more sensor measurements may include range measurements measured by the LIDAR sensor.

In some cases, the internal computing system of the first vehicle may identify, based on the one or more sensor measurements, a hazard located along a throughfare along which the first vehicle and second vehicle are also located, wherein identifying the risk to the second vehicle includes identifying that an estimated path of the second vehicle intersects with a location of the hazard, wherein the alert warns the second vehicle about the hazard. In some cases, the hazard may be mobile (e.g., a third vehicle or a pedestrian), and the internal computing device of the internal computing device of the first vehicle may identify a speed of the hazard and may estimate the location of the hazard based on the speed of the hazard. The hazard may be stationary, such as a pothole. The hazard may be a road condition, such as ice, fog, a puddle, a flood, traffic, or construction. The hazard may be a speed trap.

In some cases, the internal computing device of the first vehicle may determine a planned action that the first vehicle plans to perform, such as the right turn of FIG. 11 or the slow driving of FIG. 15. Identifying the risk to the second vehicle may include identifying based on the one or more sensor measurements that an estimated path of the second vehicle intersects with an estimated path of the first vehicle associated with performance of the planned action, and the alert may warn the second vehicle about the planned action.

Figure 22:
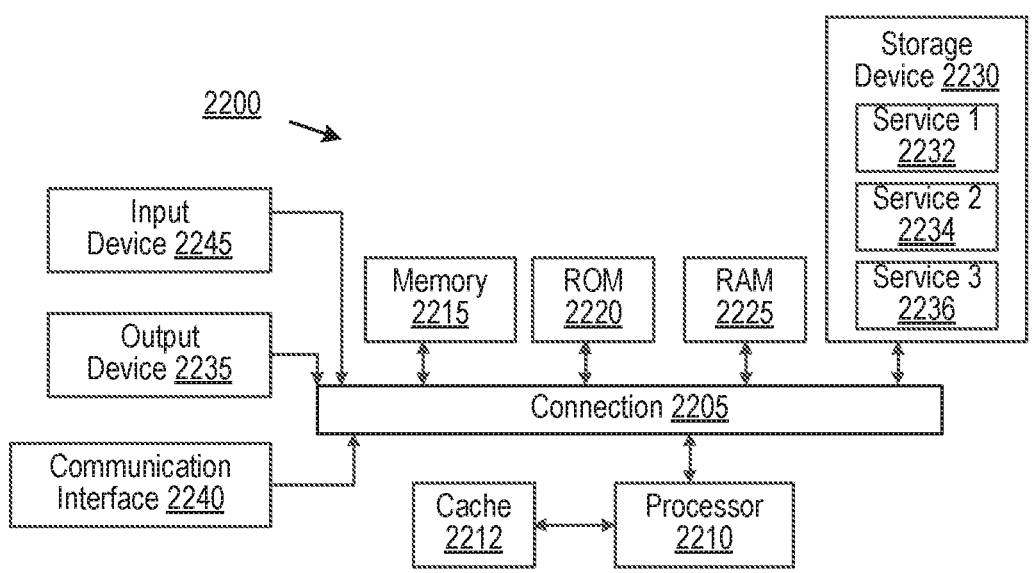
FIG. 22 illustrates an example of a system for implementing certain aspects of the present technology.

FIG. 22 shows an example of computing system 2200, which can be for example any computing device making up internal computing system 110, remote computing system 150, a passenger device executing the rideshare app 170, internal computing device 230, or any component thereof in which the components of the system are in communication with each other using connection 2205. Connection 2205 can be a physical connection via a bus, or a direct connection into processor 2210, such as in a chipset architecture. Connection 2205 can also be a virtual connection, networked connection, or logical connection.

In some embodiments, computing system 2200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 2200 includes at least one processing unit (CPU or processor) 2210 and connection 2205 that couples various system components including system memory 2215, such as read-only memory (ROM) 2220 and random access memory (RAM) 2225 to processor 2210. Computing system 2200 can include a cache of high-speed memory 2212 connected directly with, in close proximity to, or integrated as part of processor 2210.

Processor 2210 can include any general purpose processor and a hardware service or software service, such as services 2232, 2234, and 2236 stored in storage device 2230, configured to control processor 2210 as well as a special-purpose processor where software instructions are incorporated into the actual processor design. Processor 2210 may essentially be a completely self-contained computing system, containing multiple cores or processors, a bus, memory controller, cache, etc. A multi-core processor may be symmetric or asymmetric.

To enable user interaction, computing system 2200 includes an input device 2245, which can represent any number of input mechanisms, such as a microphone for speech, a touch-sensitive screen for gesture or graphical input, keyboard, mouse, motion input, speech, etc. Computing system 2200 can also include output device 2235, which can be one or more of a number of output mechanisms known to those of skill in the art. In some instances, multimodal systems can enable a user to provide multiple types of input/output to communicate with computing system 2200. Computing system 2200 can include communications interface 2240, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 2240 may also include one or more Global Navigation Satellite System (GNSS) receivers or transceivers that are used to determine a location of the computing system 2200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 2230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 2230 can include software services, servers, services, etc., that when the code that defines such software is executed by the processor 2210, it causes the system to perform a function. In some embodiments, a hardware service that performs a particular function can include the software component stored in a computer-readable medium in connection with the necessary hardware components, such as processor 2210, connection 2205, output device 2235, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system comprising:
an output device of an autonomous vehicle, wherein the output device faces an exterior area that is outside of the autonomous vehicle; and
a memory storing instructions which, when executed by one or more processors of the autonomous vehicle, cause the one or more processors to:
determine, based on one or more measurements from one or more sensors of the autonomous vehicle, a speed of a second vehicle and a distance between the autonomous vehicle and the second vehicle, wherein the second vehicle is located within the exterior area that is outside of the autonomous vehicle;
determine, based on the one or more measurements from the one or more sensors of the autonomous vehicle, a coefficient of friction associated with a thoroughfare navigated by the autonomous vehicle and the second vehicle;
determine, based on the coefficient of friction and the speed of the second vehicle, a safe distance threshold between the autonomous vehicle and the second vehicle;
identify a risk to the second vehicle, wherein the risk is based on the safe distance threshold and on at least one planned action associated with a route of the autonomous vehicle;
generate a visual alert based on the risk, the visual alert comprising an image having one or more of an alphanumeric character, a pictogram, or a symbol; and
output, by the autonomous vehicle, the visual alert using the output device that faces the exterior area outside of the autonomous vehicle such that the visual alert is directed toward the second vehicle that is located within the exterior area outside of the autonomous vehicle, wherein an attribute for outputting the visual alert is based on one or more conditions of an environment around the autonomous vehicle,
wherein the output device includes a projector, wherein outputting the visual alert using the output device includes projecting the visual alert onto a projection surface using the projector and wherein the projection surface comprises a portion of the second vehicle.

2. The system of claim 1, wherein the output device includes a display screen, wherein outputting the visual alert using the output device includes displaying the visual alert using the display screen while the display screen is facing the second vehicle.

3. The system of claim 1, wherein the one or more conditions of the environment comprise an amount of ambient light in the environment and wherein the attribute for outputting the visual alert comprise a brightness, and the one or more measurements from the one or more sensors comprise an ambient light measurement, and wherein the instructions, when executed by the one or more processors, cause the one or more processors to: adjust the brightness of the visual alert based on the ambient light measurement.

4. The system of claim 1, wherein the instructions, when executed by the one or more processors, cause the one or more processors to:
determine, based on the one or more measurements from the one or more sensors of the autonomous vehicle, a shape of the projection surface that is associated with at least one of the autonomous vehicle, the second vehicle, and the thoroughfare; and
modify the visual alert based on the shape of the projection surface to improve an appearance or legibility of the visual alert when viewed from the second vehicle or a user of the second vehicle, wherein outputting the visual alert using the output device includes projecting a modified version of the visual alert onto the projection surface.

5. The system of claim 1, wherein identifying the risk to the second vehicle includes determining that the distance between the autonomous vehicle and the second vehicle is below the safe distance threshold, and modifying the visual alert based on the distance.

6. The system of claim 1, wherein the visual alert identifies the at least one planned action associated with the route of the autonomous vehicle, wherein the at least one planned action differs from a current operation of the autonomous vehicle.

7. The system of claim 1, wherein the visual alert identifies that the distance between the autonomous vehicle and the second vehicle is greater than the safe distance threshold.

8. The system of claim 1, wherein the instructions, when executed by the one or more processors, cause the one or more processors to:
   determine an environmental condition of the environment in which the autonomous vehicle and the second vehicle are located; and
   determine the coefficient of friction based on the environmental condition.

9. The system of claim 1, wherein the instructions, when executed by the one or more processors, cause the one or more processors to:
   determine a vehicle type of the second vehicle based on one or more images captured by a camera, wherein the one or more measurements from the one or more sensors include the one or more images and the one or more sensors include the camera; and
   determine the coefficient of friction based on the vehicle type of the second vehicle.

10. The system of claim 1, wherein the one or more sensors include a light detection and ranging (LIDAR) sensor, and wherein the one or more measurements from the one or more sensors include range measurements measured by the LIDAR sensor.

11. The system of claim 1, wherein the instructions, when executed by the one or more processors, cause the one or more processors to:
   identify, based on the one or more measurements from the one or more sensors of the autonomous vehicle, a hazard located in the thoroughfare in the environment where the autonomous vehicle and second vehicle are located; and
   determine, based on the one or more measurements from the one or more sensors of the autonomous vehicle, an estimated path of the second vehicle, wherein identifying the risk to the second vehicle includes determining that the estimated path of the second vehicle will intersect with a location of the hazard at a future time and the second vehicle or a user of the second vehicle is estimated to lack visibility to the hazard,
   wherein the hazard is separate from the autonomous vehicle.

12. The system of claim 11, wherein the hazard is mobile, wherein the instructions, when executed by the one or more processors, cause the one or more processors to identify a speed of the hazard, wherein the location of the hazard that intersects with the estimated path of the second vehicle is estimated based on the speed of the hazard.

13. The system of claim 11, wherein the output device comprises a speaker device, and wherein the visual alert further comprises an audio alert identifying at least one of the hazard or a measurement specifying a distance between the hazard and at least one of the autonomous vehicle or the second vehicle.

14. The system of claim 1, wherein the instructions, when executed by the one or more processors, cause the one or more processors to identify a road condition based on the one or more measurements from the one or more sensors, the visual alert being generated based in part on the road condition, wherein the road condition comprises at least one of a speed trap, fog, construction, traffic, or a flood.

15. The system of claim 1, wherein the instructions, when executed by the one or more processors, cause the one or more processors to:
   determine, based on the one or more measurements from the one or more sensors, that an estimated path of the second vehicle intersects with the route of the autonomous vehicle associated with performance of the at least one planned action; and
   generate a particular visual that warns the second vehicle about the at least one planned action.

16. A method comprising:
   determining, based on one or more measurements from one or more sensors of an autonomous vehicle, a speed of a second vehicle and a distance between the autonomous vehicle and the second vehicle, wherein the second vehicle is located within an exterior area that is outside of the autonomous vehicle;
   determining, based on the one or more measurements from the one or more sensors of the autonomous vehicle, a coefficient of friction associated with a thoroughfare navigated by the autonomous vehicle and the second vehicle;
   determining, based on the coefficient of friction and the speed of the second vehicle, a safe distance threshold between the autonomous vehicle and the second vehicle;
   identifying a risk to the second vehicle, wherein the risk is based on the safe distance threshold and on at least one planned action associated with a route of the autonomous vehicle;
   generating a visual alert based on the risk, the visual alert comprising an image having one or more of an alphanumeric character, a pictogram, or a symbol; and
   outputting the visual alert using an output device of the autonomous vehicle that faces the exterior area outside of the autonomous vehicle such that the visual alert is directed toward the second vehicle that is located within the exterior area outside of the autonomous vehicle, wherein an attribute for outputting the visual alert is based on one or more conditions of an environment around the autonomous vehicle,
   wherein the output device includes a projector, wherein outputting the visual alert using the output device includes projecting the visual alert onto a projection surface using the projector and wherein the projection surface comprises a portion of the second vehicle.

17. A non-transitory computer readable storage medium having stored thereon instructions that, when executed by one or more processors, cause the one or more processors to:
   determine, based on one or more measurements from one or more sensors of an autonomous vehicle, a speed of a second vehicle and a distance between the autonomous vehicle and the second vehicle, wherein the second vehicle is located within an exterior area that is outside of the autonomous vehicle;
   determine, based on the one or more measurements from the one or more sensors of the autonomous vehicle, a coefficient of friction associated with a thoroughfare navigated by the autonomous vehicle and the second vehicle;

determine, based on the coefficient of friction and the speed of the second vehicle, a safe distance threshold between the autonomous vehicle and the second vehicle;

identify a risk to a second vehicle, wherein the risk is based on the safe distance threshold and on at least one planned action associated with a route of the autonomous vehicle;

generate a visual alert based on the risk, the visual alert comprising an image having one or more of an alphanumeric character, a pictogram, or a symbol; and output the visual alert using an output device associated with the autonomous vehicle such that the visual alert is directed toward the second vehicle that is located within the exterior area outside of the autonomous vehicle, wherein an attribute for outputting the visual alert is based on one or more conditions of an environment around the autonomous vehicle, wherein the output device includes a projector, wherein outputting the visual alert using the output device includes projecting the visual alert onto a projection surface using the projector and wherein the projection surface comprises a portion of the second vehicle.

\* \* \* \* \*